United States Patent
Clark

(10) Patent No.: US 10,952,822 B2
(45) Date of Patent: Mar. 23, 2021

(54) SINGLE ARCH MANDIBULAR ADVANCER

(71) Applicant: William J. Clark, Leven (GB)

(72) Inventor: William J. Clark, Leven (GB)

( * ) Notice: Subject to any disclaimer, the term of this patent is extended or adjusted under 35 U.S.C. 154(b) by 46 days.

(21) Appl. No.: 16/087,025

(22) PCT Filed: Mar. 24, 2017

(86) PCT No.: PCT/GB2017/050844
§ 371 (c)(1),
(2) Date: Sep. 20, 2018

(87) PCT Pub. No.: WO2017/163085
PCT Pub. Date: Sep. 28, 2017

(65) Prior Publication Data
US 2019/0099242 A1    Apr. 4, 2019

Related U.S. Application Data

(60) Provisional application No. 62/312,555, filed on Mar. 24, 2016.

(51) Int. Cl.
A61C 7/36    (2006.01)
A61C 7/18    (2006.01)

(52) U.S. Cl.
CPC . *A61C 7/36* (2013.01); *A61C 7/18* (2013.01)

(58) Field of Classification Search
CPC .... A61C 7/08; A61C 7/18; A61C 7/36; A61F 5/56; A61F 5/566; A61H 2205/026
See application file for complete search history.

(56) References Cited

U.S. PATENT DOCUMENTS

| 5,443,384 A | 8/1995 | Franseen et al. |
| 5,683,244 A * | 11/1997 | Truax ............ A61C 7/00 433/24 |
| 5,848,891 A * | 12/1998 | Eckhart .......... A61C 7/36 433/19 |
| 6,099,304 A | 8/2000 | Carter |
| 6,368,106 B1 * | 4/2002 | Clark ............ A61C 7/00 433/19 |
| 6,530,375 B1 * | 3/2003 | Cieslik, Jr. ...... A61F 5/566 128/848 |

(Continued)

FOREIGN PATENT DOCUMENTS

WO    0170126    9/2001

*Primary Examiner* — Jacqueline T Johanas
*Assistant Examiner* — Shannel N Wright
(74) *Attorney, Agent, or Firm* — Snell & Wilmer L.L.P.

(57) ABSTRACT

Various embodiments of orthodontic appliances are disclosed to dispose a patient's lower dentition (2) and upper dentition (2) in Class I occlusion. A representative appliance (180) includes an occlusal ridge (182) that extends over the mesio-lingual cusp and the mesio-buccal cusp of a lower first molar (14a) on one side of the patient's dentition (2), and includes another occlusal ridge (182) that extends over the mesio-lingual cusp and the mesio-buccal cusp of a lower first molar (14b) on the other side of the patient's dentition (2). Such an appliance (180) addresses a Class II malocclusion by encouraging or facilitating movement of the mandible in a mesial or anterior direction such that each such occlusal ridge (182) ends up being disposed between a corresponding upper first molar (32a, 32b) and a corresponding second bicuspid (30a, 30b).

18 Claims, 22 Drawing Sheets

(56) References Cited

U.S. PATENT DOCUMENTS

| | | | | |
|---|---|---|---|---|
| 6,604,527 | B1* | 8/2003 | Palmisano | A61C 7/08 |
| | | | | 128/848 |
| 6,932,598 | B1* | 8/2005 | Anderson | A61C 7/36 |
| | | | | 433/18 |
| 7,918,228 | B2* | 4/2011 | Smernoff | A61H 1/02 |
| | | | | 128/846 |
| 8,061,358 | B2* | 11/2011 | Smernoff | A61H 1/02 |
| | | | | 128/846 |
| 2003/0207224 | A1* | 11/2003 | Lotte | A61C 7/36 |
| | | | | 433/6 |
| 2008/0102414 | A1 | 5/2008 | Abels et al. | |
| 2011/0264017 | A1* | 10/2011 | Smernoff | A61C 9/0006 |
| | | | | 601/38 |
| 2011/0277774 | A1* | 11/2011 | Connell | A61F 5/566 |
| | | | | 128/848 |
| 2015/0079531 | A1* | 3/2015 | Heine | A61C 7/36 |
| | | | | 433/19 |
| 2016/0228286 | A1* | 8/2016 | Rayek | A61C 7/08 |
| 2017/0035534 | A1* | 2/2017 | Ross | A61F 5/566 |
| 2018/0147028 | A1* | 5/2018 | Warshawsky | A61C 7/08 |
| 2018/0235733 | A1* | 8/2018 | Ergun | A61C 7/18 |
| 2020/0214804 | A1* | 7/2020 | Lipohar | A61C 7/002 |
| 2020/0261255 | A1* | 8/2020 | Huang | A61F 5/566 |

\* cited by examiner

SINGLE ARCH MANDIBULAR ADVANCER

CROSS-REFERENCE TO RELATED APPLICATIONS

This patent application is a U.S. National Stage of PCT/GB2017/050844, filed Mar. 24, 2017, which is a non-provisional patent application of and claims the benefit of U.S. Provisional patent application Ser. No. 62/312,555 that was filed with the U.S. Patent and Trademark Office on Mar. 24, 2016, and the entire disclosure of which is hereby incorporated by reference in its entirety herein.

FIELD OF THE INVENTION

The present invention generally relates to the field of orthodontics and, more particularly, to facilitating the disposition of a patient's upper and lower dentitions in Class I occlusion.

BACKGROUND

Class II malocclusions exist when an individual's upper jaw or maxilla protrudes further out from the individual's face than his/her lower jaw or mandible. Conversely, Class III malocclusions exist when an individual's lower jaw or mandible protrudes further out from the individual's face than his/her upper jaw or maxilla. Treatment of a Class II malocclusion may entail exerting a functional orthopedic force on the individual's lower jaw or mandible so as to advance the same in a mesial or anterior direction.

One way in which orthodontic treatment forces have been applied to address a Class II malocclusion is through a facebow to retract the upper jaw or maxilla to match the position of a retruded mandible. As a large percentage of Class II malocclusions are due to a deficient mandible, it is more beneficial to the patient to advance the mandible than to retract the maxilla. This results in a better profile and a more balanced facial appearance compared to orthodontic techniques which retract the maxillary teeth to match the position of a retrusive mandible. The disadvantage of this approach is that the nose continues to grow, when the maxilla is retracted, and the nose becomes unduly prominent in the profile, while the maxilla and mandible are retracted to a retrusive position. This approach may align the anterior teeth, but at the same time, is detrimental to the patient's facial appearance.

An alternative to a functional orthopedic approach to correct a mandibular retrusion would entail a combination of orthodontic and surgical correction to align the teeth and advance the mandible to match the correctly positioned maxilla. Orthopedic correction achieves a similar result by correcting the mandibular position without surgery in many cases. It may be important to integrate orthopedic techniques with conventional orthodontic techniques in order to allow the simultaneous correction of skeletal and dental abnormalities.

Another option which has been utilized to affect mesially-directed mandibular advancement is through what has been characterized in the orthodontic industry as "bite blocks." Bite blocks generally include a planar surface which is disposed at an angle relative to an individual's occlusal plane when the bite blocks are installed on the patient. Typically a pair of bite blocks are installed on the occlusal surface of the patient's upper dental arch on opposite sides thereof (i.e., one on the right side of the upper dental arch, and another on the left side of the upper dental arch), while a pair of bite blocks are also installed on the occlusal surface of the patient's lower dental arch on opposite sides thereof (i.e., one on the right side of the lower dental arch, and another on the left side of the lower dental arch). Each of these bite blocks are installed so that there is a camming-like action between the two bite blocks which are occlusally installed on the patient's upper arch and their corresponding bite blocks which are occlusally installed on the patient's lower arch.

Both fixed and removable attachment techniques have been suggested for bite blocks generally of the above-noted type. "Fixed" in the orthodontic treatment sense means that a particular appliance is installed on the orthodontic patient in such a manner so that at least in theory the orthodontic patient will not be able to readily remove the appliance, but so that the appliance may be removed by the orthodontic practitioner utilizing the proper tool(s). "Removable" in the orthodontic treatment sense means that a particular appliance is installed on the orthodontic patient in such a manner so that the appliance may be readily removed by both the orthodontic patient and practitioner.

SUMMARY

The present invention is directed to and/or uses an orthodontic appliance that is installed on only one dentition of a patient (i.e., on a single patient dentition), that includes an occlusal protrusion that is disposed over at least one cusp of at least one tooth in this dentition (with such a cusp being on the occlusal surface of such a tooth), that directly engages the opposite dentition of the patient (i.e., this orthodontic appliance does not cooperate with an orthodontic appliance that is installed on the opposite dentition), and that encourages or facilitates disposing the patient's upper and lower dentitions into Class I occlusion. Typically such an occlusal protrusion will be disposed over corresponding teeth on each side of a midline of a common dentition (e.g., one occlusal protrusion being disposed over a first molar on one side of a patient's dentition (the lower dentition or the upper dentition), and a different occlusal protrusion being disposed over a first molar on the opposite side of this same dentition).

The above-noted orthodontic appliance may be installed on the relevant dentition of a patient in any appropriate manner. For instance, the noted occlusal protrusion may be mounted to a single tooth in the relevant dentition (e.g., via or using an orthodontic band installed on a single tooth in the relevant dentition). Another option in this regard is to integrally form an occlusal protrusion on an occlusal surface of a crown. Multiple occlusal protrusions could be formed on an overlay that is installed over multiple teeth in the relevant dentition, typically such that a single such occlusal protrusion is disposed on each side of a midline of this overlay.

A first aspect of the present invention is directed to a method of using an orthodontic appliance. A first orthodontic appliance is installed on a first dentition of a patient and includes a first portion that protrudes beyond an occlusal plane between the patient's first and second dentitions. When the patient's first and second dentitions are in a first relative position in a mesial-distal dimension (also referred to as a mesio-distal dimension), the first portion of the first appliance will engage the second dentition (e.g., an occlusal surface) to obstruct closure of the patient's jaws. The patient's lower jaw is moved relative to the upper jaw to dispose the first and second dentitions in a second relative position in the noted mesial-distal dimension. With the first and second dentitions being in this second relative position, the patient is now able to close the jaws as a result of the first portion of the first appliance being directed into a space between an adjacent pair of teeth in the patient's second dentition. The orthodontic appliance may be used to force or direct the patient's first and second dentitions into the noted second relative position in the mesial-distal dimension.

A number of feature refinements and additional features are separately applicable to at least the first aspect of the present invention. These feature refinements and additional features may be used individually or in any combination in relation to at least the first aspect. The first appliance is preferably retained in a fixed position relative to the first dentition on which the first appliance is installed. Moreover, the first appliance may be installed in any appropriate manner on the first dentition. The first appliance may be installed on the first dentition using a single tooth. For instance, the first appliance may utilize an orthodontic band that is installed on a single tooth, where the first portion may be characterized as being disposed occlusally above the same tooth on which this orthodontic band is installed. Another option in this regard is for the first appliance to be in the form of an orthodontic crown, where the first portion is an occlusal protrusion on an occlusal surface of such a crown. The first appliance may be in the form of an overlay that is disposed over multiple teeth of the first dentition, and the noted first portion may be an occlusal protrusion that is incorporated on an occlusal surface of this overlay.

The first appliance may be installed on the patient's first dentition and its first portion may directly engage the patient's second dentition in a manner so as to retain the first and second dentitions in the noted second relative position (i.e., there is direct contact between the first portion of the first appliance and the second dentition at least when the patient's first and second dentitions are in the noted second relative position). One embodiment has the first dentition being the patient's lower dentition. Another embodiment has the first dentition being the patient's upper dentition. The first portion of the first appliance may be configured and/or located to address a Class II malocclusion (e.g., the noted first relative position in the mesial-distal dimension), both when the first appliance is installed on the patient's lower dentition as well as when the first appliance is installed on the patient's upper dentition. Similarly, the first portion of the first appliance may be configured and/or located to address a Class III malocclusion (e.g., the noted first relative position in the mesial-distal dimension), both when the first appliance is installed on the patient's lower dentition as well as when the first appliance is installed on the patient's upper dentition.

A second aspect of the present invention is directed to an orthodontic appliance that includes a band (e.g., configured to encircle a tooth on which the band is installed), a lingual attachment disposed/fixed on a lingual surface of this band, and an attachment. This attachment is installed with the lingual attachment and includes an occlusal protrusion. The occlusal protrusion of the attachment is disposed over a mesial-lingual cusp and a mesial-buccal cusp of a tooth when the band is installed on this tooth, or is disposed over a distal-lingual cusp and a distal-buccal cusp of a tooth when the band is installed on this tooth (depending on whether the orthodontic appliance is installed on the lower dentition or the upper dentition, and on whether the orthodontic appliance is being used to address a Class II malocclusion or a Class III malocclusion).

A number of feature refinements and additional features are separately applicable to at least the second aspect of the present invention. These feature refinements and additional features may be used individually or in any combination in relation to at least the second aspect. For instance, the orthodontic appliance of the second aspect may be used in the execution of the method for the first aspect. The occlusal protrusion preferably does not appreciably deflect when engaging the opposing dentition, for instance in the execution of the method for the first aspect.

The occlusal protrusion may be of any appropriate configuration, for instance in the shape of a wire, a square or rectangular rod, a wedge (e.g., formed over such a wire or rod), or the like. This occlusal protrusion may have a free end that is disposed at least generally at the buccal of the corresponding dentition when the orthodontic appliance of the second aspect is in the installed configuration. A pair of orthodontic appliances in accordance with the second aspect may be installed on a common dentition, typically on a corresponding tooth on each side of this common dentition. For instance, one orthodontic appliance of the second aspect may be installed on a first molar on one side of a patient's dentition, and another orthodontic appliance of the second aspect may be installed on a first molar on the opposite side of this same dentition. Another option would be for one orthodontic appliance of the second aspect to be installed on a second molar on one side of a patient's dentition, and for another orthodontic appliance of the second aspect to be installed on a second molar on the opposite side of this same dentition. The attachment may be an integrally-formed structure, such that there is no joint throughout the entirety of the attachment.

A third aspect of the present invention is directed to an orthodontic crown for installation on a single tooth of a patient's dentition. This crown includes an occlusal surface, as well as a mesial side, a distal side, a lingual side, and a buccal side that each project toward a corresponding tooth surface when the crown is in an installed configuration. The occlusal surface of the crown includes a first occlusal protrusion that extends at least generally from the lingual of the crown (e.g., where crown's occlusal surface intersects the lingual side) to the buccal of the crown (e.g., where the crown's occlusal surface intersects the buccal side), a first occlusal surface that extends from this first occlusal protrusion to the mesial of the crown (e.g., where the crown's occlusal surface intersects the mesial side), and a second occlusal surface that extends from this first occlusal protrusion to the distal of the crown (e.g., where the crown's occlusal surface intersects the distal side). The first occlusal surface and the second occlusal surface are each recessed relative to the first occlusal protrusion (e.g., its apex).

A number of feature refinements and additional features are separately applicable to at least the third aspect of the present invention. These feature refinements and additional features may be used individually or in any combination in relation to at least the third aspect. For instance, the orthodontic crown of the third aspect may be used in the execution of the method for the first aspect.

The occlusal protrusion may be disposed over the location of a mesial-lingual cusp and a mesial-buccal cusp associated with a tooth on which the crown is installed, or may be disposed over the location of a distal-lingual cusp and a distal-buccal cusp associated with a tooth on which the crown is installed (depending on whether the orthodontic appliance of the third aspect is installed on the lower dentition or the upper dentition, and on whether the orthodontic appliance of the third aspect is being used to address a Class II malocclusion or a Class III malocclusion). A pair of orthodontic crowns in accordance with the third aspect may be installed on a common dentition, typically on a corresponding tooth on each side of this common dentition. For instance, an orthodontic crown of the third aspect may be installed on a first molar on one side of a patient's dentition, and another orthodontic crown of the third aspect may be installed on a first molar on the opposite side of this same dentition. Another option would be for one orthodontic crown of the third aspect to be installed on a second molar on one side of a patient's dentition, and for another orthodontic crown of the third aspect to be installed on a second molar on the opposite side of this same dentition.

A fourth aspect of the present invention is directed to an orthodontic appliance in the form of an overlay that is installable over multiple teeth of a patient's dentition. The overlay includes a first occlusal protrusion and a separate second occlusal protrusion that each extend at least generally from the lingual of the overlay to the buccal of the overlay (i.e., the first and second occlusal protrusion are on the occlusal of the overlay). The first occlusal protrusion is on a first side of a midline for the overlay, while the second occlusal protrusion is on the opposite second side of this same midline for the overlay.

A number of feature refinements and additional features are separately applicable to at least the fourth aspect of the present invention. These feature refinements and additional features may be used individually or in any combination in relation to at least the fourth aspect. For instance, the orthodontic appliance of the fourth aspect may be used in the execution of the method for the first aspect. The first and second occlusal protrusions may be the occlusal-most surfaces of the overlay—the entire remainder of the occlusal surface of the overlay may be characterized as being recessed relative to the first and second occlusal protrusions.

The first and second occlusal protrusions each may be disposed over a mesial-lingual cusp and a mesial-buccal cusp of a corresponding tooth of the dentition on which the overlay is installed, or may be disposed over a distal-lingual cusp and a distal-buccal cusp of a corresponding tooth of the dentition on which the overlay is installed (depending on whether the orthodontic appliance of the fourth aspect is installed on the lower dentition or the upper dentition, and on whether the orthodontic appliance of the fourth aspect is being used to address a Class II malocclusion or a Class III malocclusion). For instance, the first occlusal protrusion of the fourth aspect may be installed over the relevant cusps of the first molar on one side of a patient's dentition, while the second occlusal protrusion of the fourth aspect may be installed over the relevant cusps of the first molar on the opposite side of this same dentition (e.g., the overlay may be disposed over all teeth that are located mesially of the first molars, and/or could also be disposed over one or more teeth that are located distally of the first molars). Another option would be for the first occlusal protrusion of the fourth aspect to be installed over the relevant cusps of the second molar on one side of a patient's dentition, and for the second occlusal protrusion of the fourth aspect to be installed over the relevant cusps of the second molar on the opposite side of this same dentition (e.g., the overlay may be disposed over all teeth that are located mesially of the second molars, and/or could also be disposed over any teeth that are located distally of the second molars).

A fifth aspect of the present invention is directed to an orthodontic appliance in the form of an overlay that is installable over multiple teeth of a patient's dentition. The overlay includes a first occlusal protrusion and a separate second occlusal protrusion. The first occlusal protrusion is on a first side of a midline for the overlay and extends above a single cusp of a tooth when the overlay is installed, while the second occlusal protrusion is on the opposite second side of this midline for the overlay and extends above a single cusp of a tooth when the overlay is installed.

A number of feature refinements and additional features are separately applicable to at least the fifth aspect of the present invention. These feature refinements and additional features may be used individually or in any combination in relation to at least the fifth aspect. For instance, the orthodontic appliance of the fifth aspect may be used in the execution of the method for the first aspect. The first and second occlusal protrusions each may be referred to as a lingual cuspal extension. The first and second occlusal protrusions may be the occlusal-most surfaces of the overlay—the entire remainder of the occlusal surface of the overlay may be characterized as being recessed relative to the first and second occlusal protrusions.

The first and second occlusal protrusions each may be disposed over a mesial-lingual cusp of a corresponding tooth of the dentition on which the overlay is installed, or may be disposed over a distal-lingual cusp of a corresponding tooth of the dentition on which the overlay is installed (depending on whether the orthodontic appliance of the fifth aspect is installed on the lower dentition or the upper dentition, and on whether the orthodontic appliance of the fifth aspect is being used to address a Class II malocclusion or a Class III malocclusion). For instance, the first occlusal protrusion of the fifth aspect may be installed over the relevant lingual cusp of the first molar on one side of a patient's dentition, while the second occlusal protrusion of the fifth aspect may be installed over the relevant lingual cusp of the first molar on the opposite side of this same dentition (e.g., the overlay may be disposed over all teeth that are located mesially of the first molars, and/or could also be disposed over one or more teeth that are located distally of the first molars). Another option would be for the first occlusal protrusion of the fifth aspect to be installed over the relevant lingual cusp of the second molar on one side of a patient's dentition, and for the second occlusal protrusion of the fourth aspect to be installed over the relevant lingual cusp of the second molar on the opposite side of this same dentition (e.g., the overlay may be disposed over all teeth that are located mesially of the second molars, and/or could also be disposed over any teeth that are located distally of the second molars).

A sixth aspect of the present invention is directed to an orthodontic appliance that includes a band (e.g., configured to encircle a tooth on which the band is installed), a lingual attachment disposed/fixed on a lingual surface of this band, and an attachment. This attachment is installed with the lingual attachment and includes an occlusal protrusion in the form of a loop. The occlusal protrusion of the attachment is disposed over a single cusp of a tooth when the band is installed on this tooth, where this single cusp is a lingual cusp.

A number of feature refinements and additional features are separately applicable to at least the sixth aspect of the present invention. These feature refinements and additional features may be used individually or in any combination in relation to at least the sixth aspect. For instance, the orthodontic appliance of the sixth aspect may be used in the execution of the method for the first aspect, and may be adapted to address a Class II malocclusion or a Class III malocclusion.

A pair of orthodontic appliances in accordance with the sixth aspect may be installed on a common dentition, typically on a corresponding tooth on each side of this common dentition. For instance, one orthodontic appliance of the sixth aspect may be installed on a first molar on one side of a patient's dentition, and another orthodontic appliance of the sixth aspect may be installed on a first molar on the opposite side of this same dentition. Another option would be for one orthodontic appliance of the sixth aspect to be installed on a second molar on one side of a patient's dentition, and for another orthodontic appliance of the sixth aspect to be installed on a second molar on the opposite side of this same dentition. The attachment may be an integrally-formed structure, such that there is no joint throughout the entirety of the attachment.

A seventh aspect of the present invention is directed to an orthodontic model that includes a first dentition model having a first plurality of modeled teeth, along with a second dentition module having a second plurality of modeled teeth. A first appliance is installed on the first dentition and includes a first portion that protrudes beyond an occlusal plane between the first dentition model and the second dentition model. In a first configuration where the first and second dentition models are in Class I occlusion, the first portion of the first appliance is disposed within a space between an adjacent pair of modeled teeth in the second dentition model.

A number of feature refinements and additional features are separately applicable to at least the seventh aspect of the present invention. These feature refinements and additional features may be used individually or in any combination in relation to at least the seventh aspect. The orthodontic appliance of the second, third, fourth, fifth, or sixth aspects may be used by the seventh aspect. The orthodontic model of the seventh aspect may be a physical model or may be a digital model.

An eighth seventh aspect of the present invention is directed to an orthodontic appliance that may be installed on a single dentition. The orthodontic appliance includes an occlusal protrusion. When the orthodontic appliance is in an installed configuration on a first dentition: 1) the occlusal protrusion is disposed over the occlusal of a tooth in the first dentition; 2) the occlusal protrusion extends beyond an occlusal plane between this first dentition and an opposing second dentition; 3) the occlusal protrusion will contact an occlusal surface of a corresponding tooth in the second dentition when the first and second dentitions are not in Class I occlusion; and 4) the occlusal protrusion is sized for disposition within a space between an adjacent pair of teeth in second dentition when the first and second dentitions are in Class I occlusion and where the corresponding tooth is one of the adjacent pair.

A number of feature refinements and additional features are separately applicable to at least the eighth aspect of the present invention. These feature refinements and additional features may be used individually or in any combination in relation to at least the eighth aspect. The orthodontic appliance of the eighth aspect encompasses those addressed above regarding the second, third, fourth, fifth, and sixth aspects.

DETAILED DESCRIPTION

Figure 1:
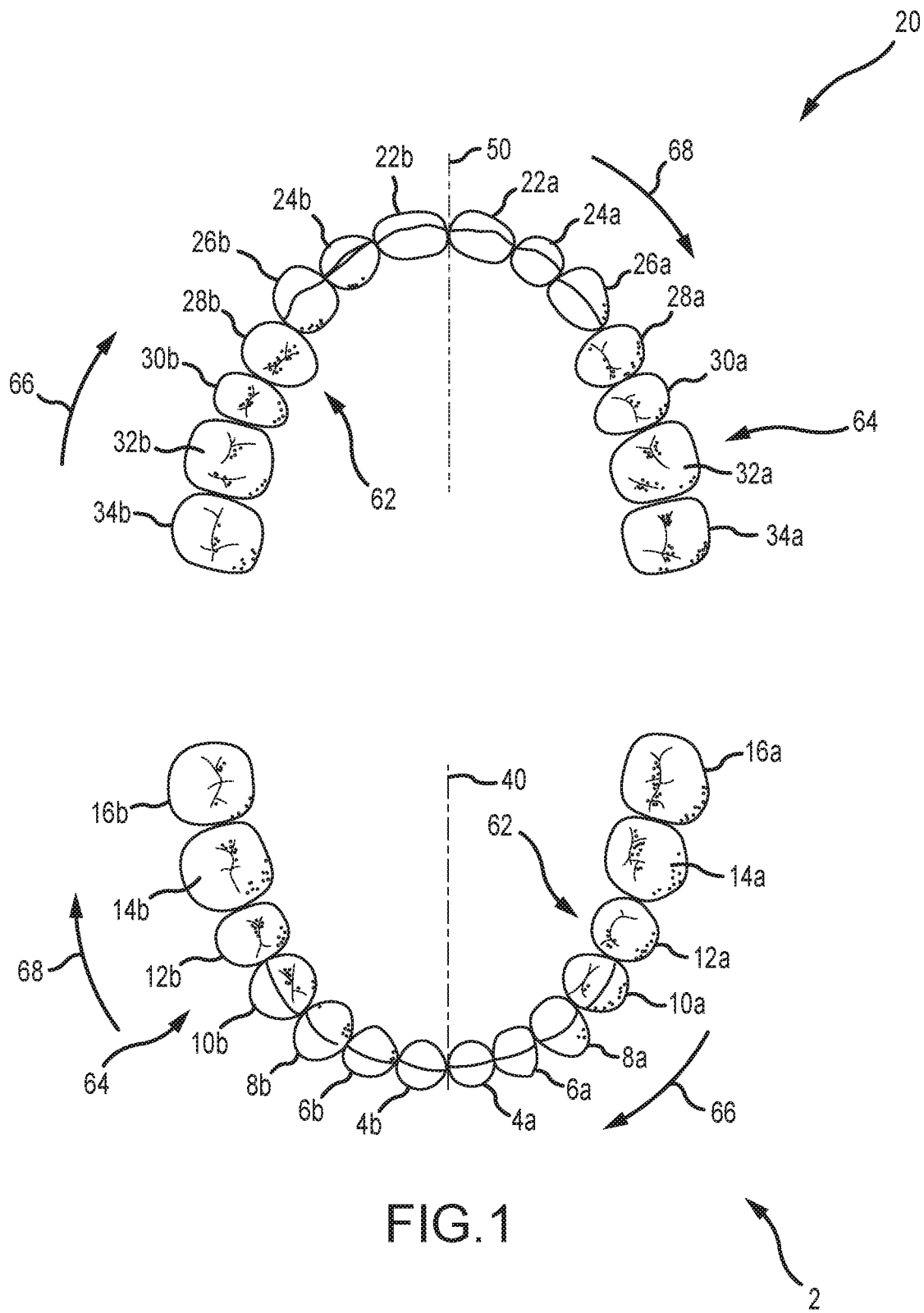
FIG. 1 is an occlusal view of a lower arch/dentition and an upper arch/dentition.

Various embodiments of orthodontic appliances will be described with regard to the above-noted figures. Each of these embodiments have the following common characteristics: 1) they are installed on a single dental arch or dentition (e.g., a patient; a model); 2) they include at least one portion that protrudes beyond an occlusal plane of the corresponding dentition; 3) each such protrusion directly engages the opposing dentition (i.e., the dentition that is opposite of the dentition on which the orthodontic appliance is installed) to prevent jaw closure than other than when the dentitions are disposed in Class I occlusion (versus engaging an orthodontic appliance on the opposing dentition)—the protrusion provides an occlusal obstruction unless/until the upper and lower dentitions are disposed in Class I occlusion; 4) each such protrusion may cam off of or engage a surface of a single tooth in the opposing dentition (e.g., a distal aspect or a mesial aspect of the tooth) to facilitate or encourage advancement of a corresponding jaw in a mesial or anterior direction so as to dispose the upper and lower dentitions in Class I occlusion; and 5) each such protrusion may be disposed in a space between a pair of adjacent teeth in the opposing dentition when the upper and lower dentitions are in Class I occlusion (and that allows closure of the jaws). In a preferred embodiment, a protrusion of the above-noted type is disposed on opposite sides of the midline of the dentition on which the orthodontic appliance(s) is installed, preferably on corresponding teeth on opposite sides of this midline (e.g., on a first molar on each side of the midline for the corresponding dentition; on a second molar on each side of the midline of the corresponding dentition). That is, preferably one occlusal protrusion is disposed on one side of a midline of a patient's dentition, while another occlusal protrusion is disposed on the other side of the midline of this same dentition.

In the case of a Class II malocclusion, the patient's mandible (lower jaw) is in a retracted or retruded state or condition relative to the patient's maxilla (upper jaw). In this case, the embodiments described herein may be used to facilitate or encourage mandibular growth (in the mesial or anterior direction) and/or to restrict maxillary growth (in the mesial or anterior direction), all to cause the molars of the upper and lower dentitions of the patient to occlude in a Class I molar relationship. In the case of a Class III malocclusion, the patient's maxilla is in a retracted or retruded state or condition relative to the patient's mandible. In this case, the embodiments described herein may be used to facilitate or encourage maxillary growth (in the mesial or anterior direction) and/or to restrict mandibular growth (in the mesial or anterior direction), all to cause the molars of the upper and lower dentitions of the patient to occlude in a Class I molar relationship.

The orthodontic appliances described herein are preferably installed on a first molar of the relevant dentition, but alternatively could be installed on a second molar as noted. The noted protrusion of each such appliance preferably engages and cams off of a single tooth in the opposite dentition, preferably a first or a second molar, all to encourage or facilitate movement of one of the upper jaw or the lower jaw in the mesial or anterior direction (e.g., if an orthodontic appliance with an occlusal protrusion is installed on a first molar in one of the patient's dentitions, the occlusal protrusion should engage the corresponding first molar in the other of the patient's dentitions; if an orthodontic appliance with an occlusal protrusion is installed on a second molar in one of the patient's dentitions, the occlusal protrusion should engage the corresponding second molar in the other of the patient's dentitions). The protrusion of a given appliance may be disposed over a mesio-lingual cusp (or which may be also referred to as a mesial-lingual cusp) and a mesial-buccal cusp of the tooth on which the appliance is installed, or may be disposed over a distal-lingual cusp and a distal-buccal cusp of the tooth on which the appliance is installed, depending upon whether the appliance is installed on the upper dentition or the lower dentition, and further depending upon whether a Class II malocclusion or Class III malocclusion is being addressed by the orthodontic appliance. The occlusal protrusion of the orthodontic appliances described herein, in order to function in the manner described herein, may be characterized as being located close to but spaced from either the mesial aspect or the distal aspect of the corresponding tooth (again, depending upon whether the appliance is installed on the upper dentition or the lower dentition, and further depending upon whether a Class II malocclusion or Class III malocclusion is being addressed by the orthodontic appliance).

FIG. 1 illustrates a lower dental arch or dentition 2, along with an upper dental arch or dentition 20 of a patient. The lower dental arch 2 generally includes the same type of teeth on each side of a midline 40 thereof. Teeth on one side of the midline 40 include an "a" designation, while teeth on the opposite side of the midline 40 include a "b" designation. The lower dental arch 2 includes the following teeth: a lower central 4a and 4b, a lower lateral 6a and 6b, a lower cuspid 8a and 8b, a lower first bicuspid 10a and 10b, a lower second bicuspid 12a and 12b, a lower first molar 14a and 14b, and a lower second molar 16a and 16b. The upper dental arch 20 generally includes the same type of teeth on each side of a midline 50 thereof. Teeth on one side of the midline 50 include an "a" designation, while teeth on the opposite side of the midline 50 include a "b" designation. The upper dental arch 20 includes the following teeth: an upper central 22a and 22b, an upper lateral 24a and 24b, an upper cuspid 26a and 26b, an upper first bicuspid 28a and 28b, an upper second bicuspid 30a and 30b, an upper first molar 32a and 32b, and an upper second molar 34a and 34b.

The lingual for each of the lower dentition 2 and the upper dentition 20 is identified by reference numeral 62 in FIG. 1 (e.g., the tongue side of the corresponding dentition), while the labial or the buccal for each of the lower dentition 2 and the upper dentition 20 is identified by reference numeral 64. The mesial direction is identified by the arrow 66, while the distal direction is identified by the arrow 68 in FIG. 1

("mesial" and "distal" being defined in relation to the midline of the corresponding dentition; e.g., the mesial direction on a given side of a given dentition means proceeding in the direction of the corresponding midline and along the corresponding dentition).

Figure 1A:
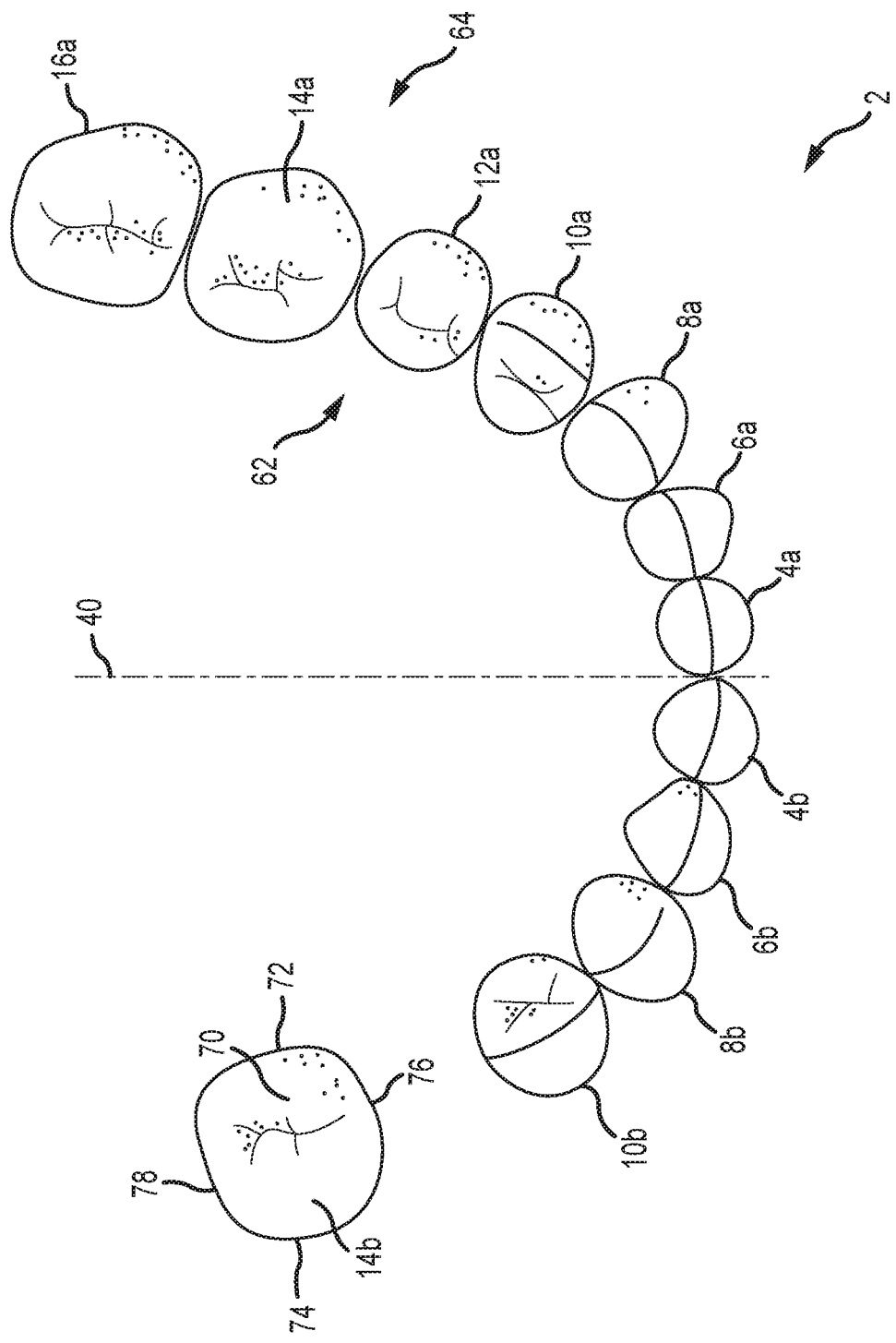
FIG. 1A is an enlarged occlusal view of the lower arch/dentition shown in FIG. 1, with the lower second bicuspid and the lower second molar having been removed from one side of a midline for the lower arch/dentition.

FIG. 1A shows the lower dentition 2, with the lower second bicuspid 12b and the lower second molar 16b having been removed to enhance labeling of the lower first molar 14b. The lower first molar 14b includes an occlusal surface 70, a lingual side 72 (i.e., located on the lingual 62 of the lower dentition 2), an oppositely disposed buccal or labial side 74 (i.e., located on the buccal 64 of the lower dentition 2), a mesial side 76 (i.e., located on the mesial of the lower first molar 14b), and a distal side 78 (i.e., located on the distal of the lower first molar 14b). Each tooth in each of the lower dentition 2 and the upper dentition 20 of course may be similarly defined.

Figure 2:
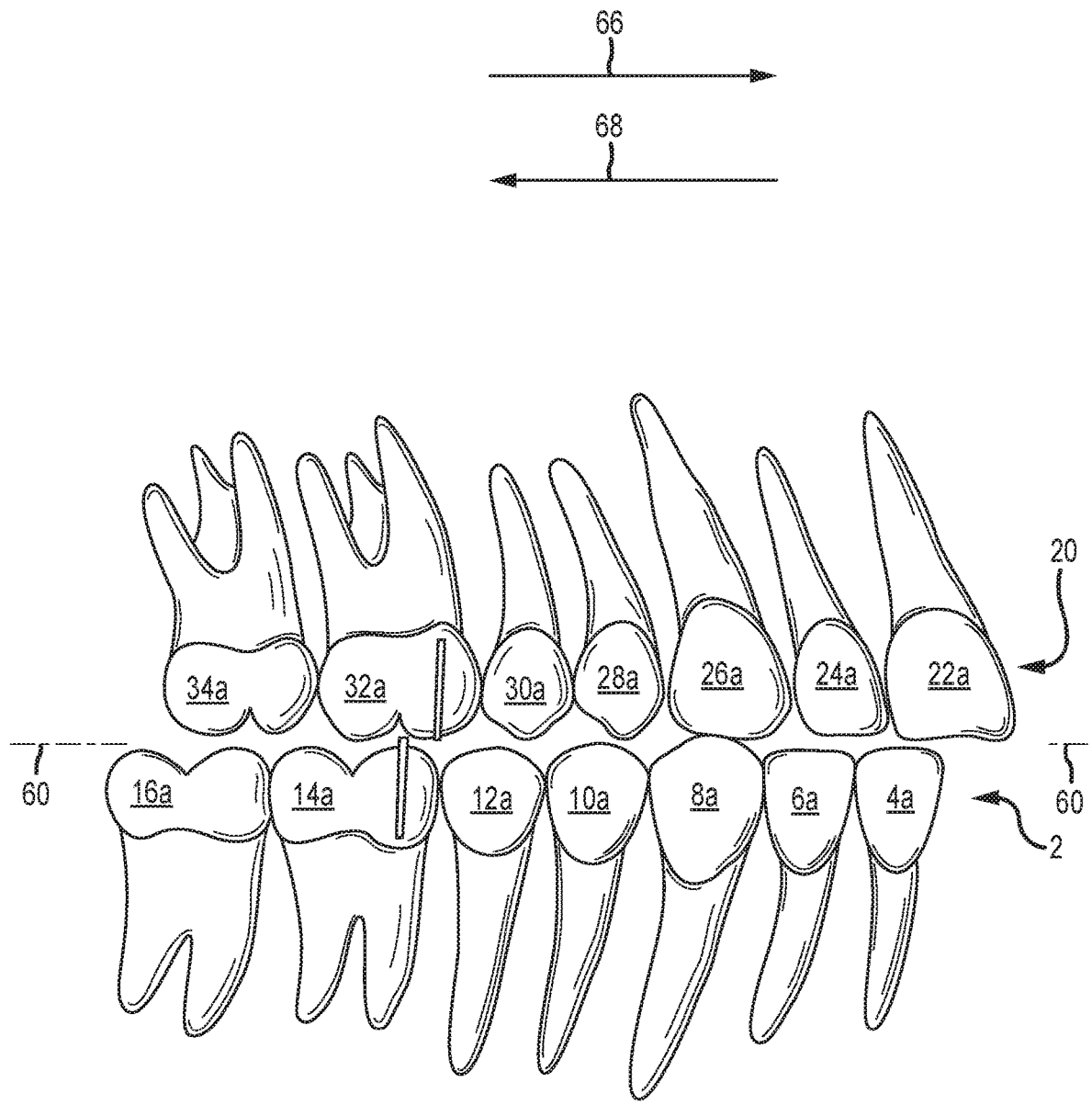
FIG. 2 is a lingual view of one side of the lower arch/dentition and upper arch/dentition, and where the molars of the lower arch/dentition and the molars of the upper arch/dentition are in Class II malocclusion.

FIG. 2 is a lingual view of one side of the lower dentition 2 and the upper dentition 20, for the case where the lower dentition 2 is retracted relative to the upper dentition 20 (e.g., a Class II malocclusion). This undesirable "offset" is further indicated by the line on the upper first molar 32a and the line on the lower first molar 14a. An occlusal plane 60 is also depicted in FIG. 2. The occlusal plane 60 may be characterized as a reference plane that is at least generally tangent to each of the lower dentition 2 and upper dentition 20 when the mandible and maxilla are in a closed position. A Class III malocclusion would be the inverse to what is shown in FIG. 2. In a Class III malocclusion, the upper dentition 20 is retracted relative to the lower dentition 2.

Various embodiments of orthodontic appliances will now be described. Although these orthodontic appliances may be illustrated as being installed on the lower dentition 2 of a patient, alternatively they could be installed on the upper dentition 20 of the patient. Each of these embodiments includes at least one occlusal protrusion. Each such occlusal protrusion is the occlusal-most portion of the corresponding appliance—the remainder of the appliance is recessed relative to each such occlusal protrusion (e.g., its apex).

Figure 3A:
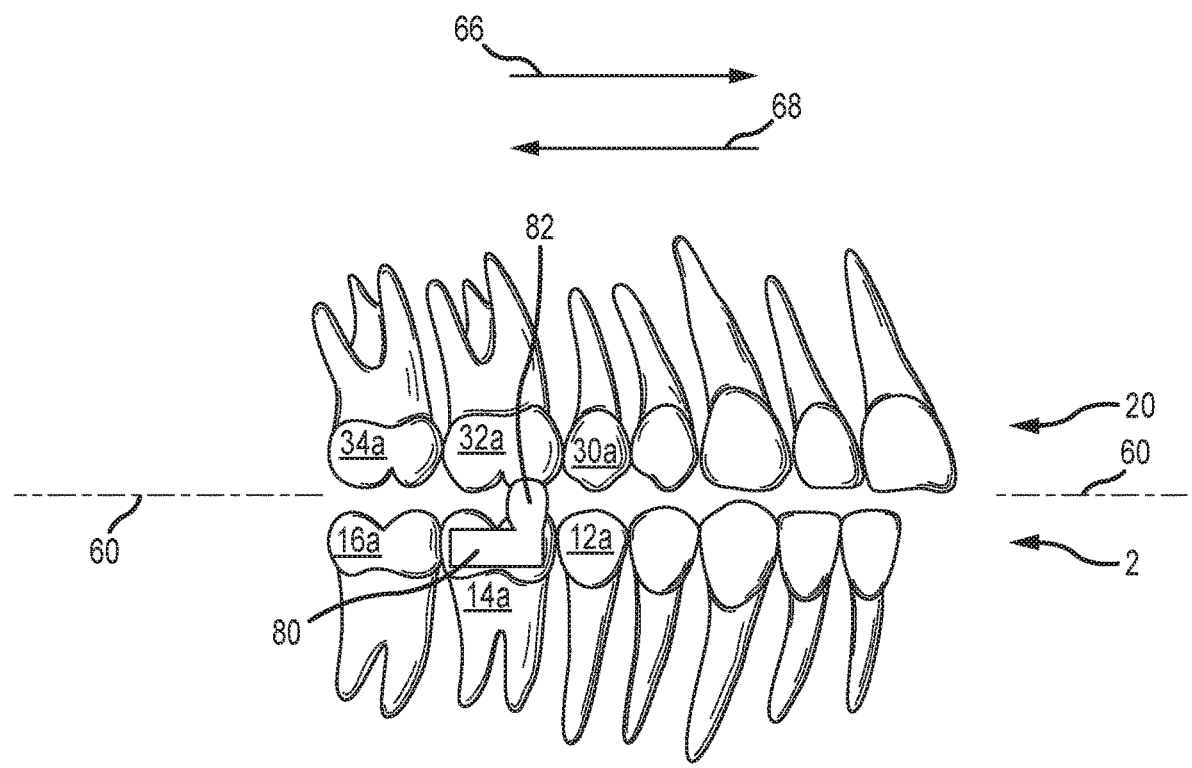
FIGS. 3A-3C are sequential lingual views of one side of the lower arch/dentition and upper arch/dentition, along with a schematic of an orthodontic appliance that facilitates changing from at least one type of malocclusion to a Class I occlusion.
Figure 3B:
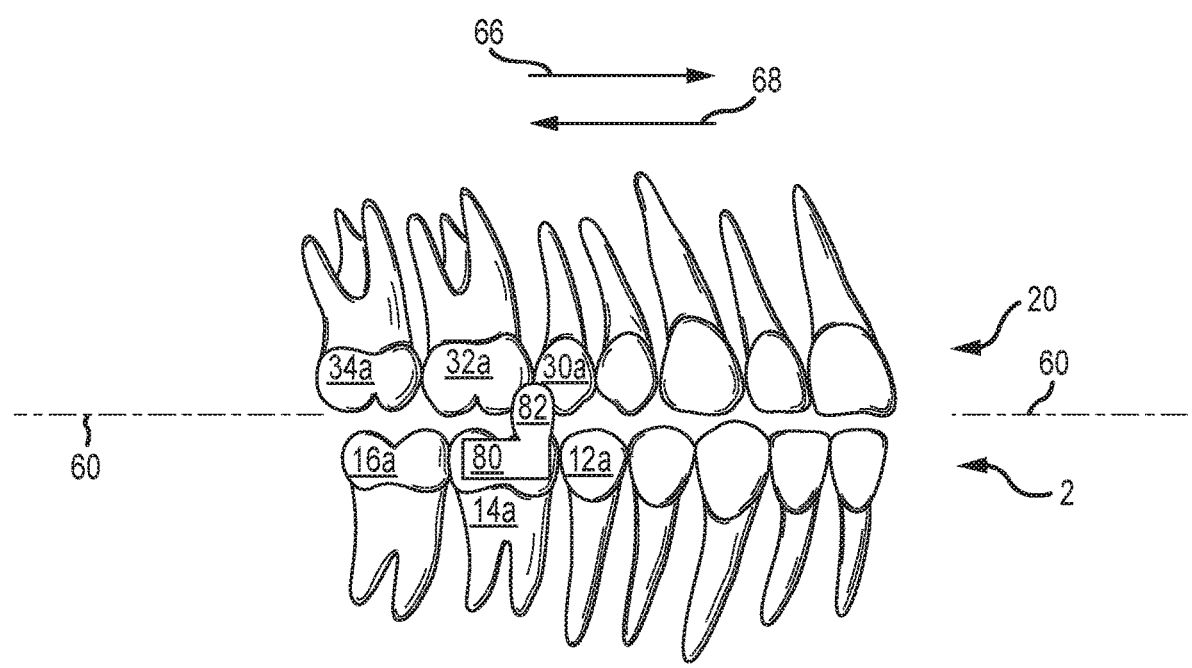
Figure 3C:
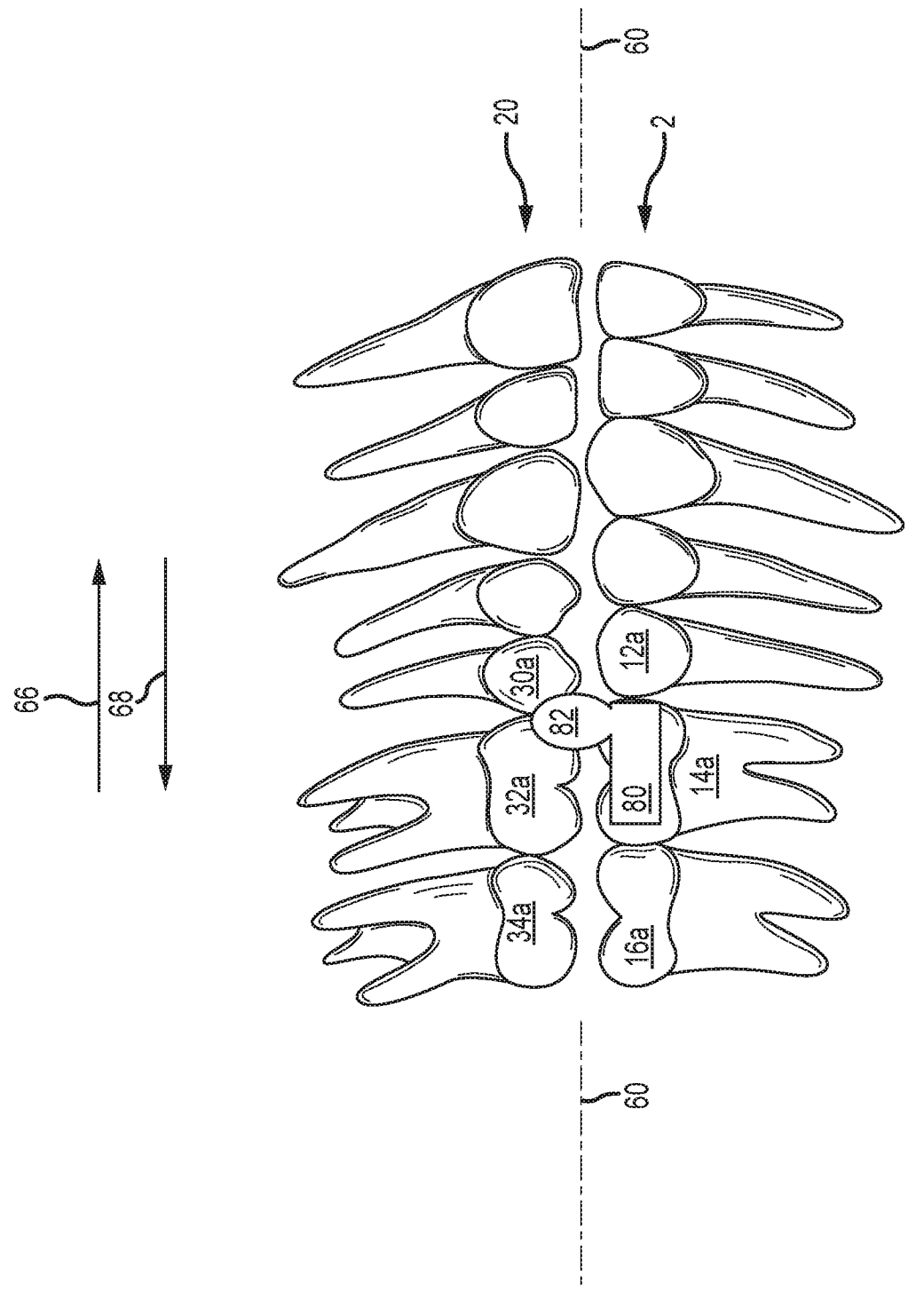

A schematic of one embodiment of an orthodontic appliance in accordance with the foregoing is illustrated in FIGS. 3A-3C and is identified by reference numeral 80. The orthodontic appliance 80 is installed on the lingual 62 of the lower dentition 2 in FIGS. 3A-3C, and includes a first portion 82 that protrudes beyond the occlusal plane 60. FIG. 3A illustrates the lower dentition 2 in a retracted position relative to the upper dentition 20 (e.g., a Class II malocclusion). With the dentitions 2, 20 being in this relative position, the first portion 82 of the orthodontic appliance 80 prevents closure. That is, the first portion 82 of the orthodontic appliance 80 on the lower dentition 2 will engage the upper dentition 20 (e.g., the occlusal surface 70 of the upper first molar 32a). Directing the lower dentition 2 in the mesial direction 66 (or the anterior direction) will align the first portion 82 of the orthodontic appliance 80 with the space between the upper first molar 32a and the upper second bicuspid 30a of the upper dentition 20 (FIG. 3B). At this time the dentitions 2, 20 may be moved to the closed position illustrated in FIG. 3C where the first portion 82 of the orthodontic appliance 80 (lower dentition 2) will be disposed within the space between the upper first molar 32a and the upper second bicuspid 30a (upper dentition 20) and which should retain the lower dentition 2 in this position relative to the upper dentition 20 (e.g., in Class I occlusion).

Figure 4A:
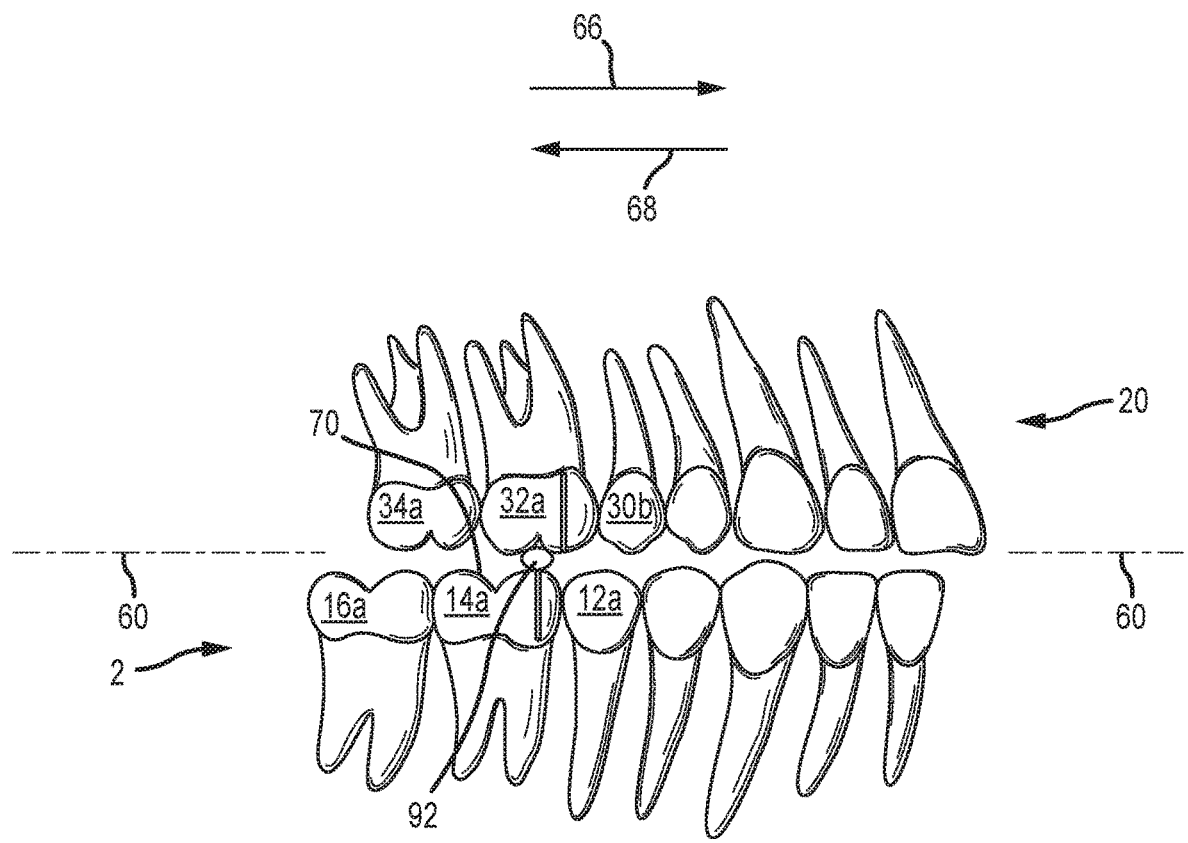
FIGS. 4A-4C are sequential lingual views of one side of the lower arch/dentition and upper arch/dentition, along an occlusal wire that facilitates changing from at least one type of malocclusion to a Class I occlusion.
Figure 4B:
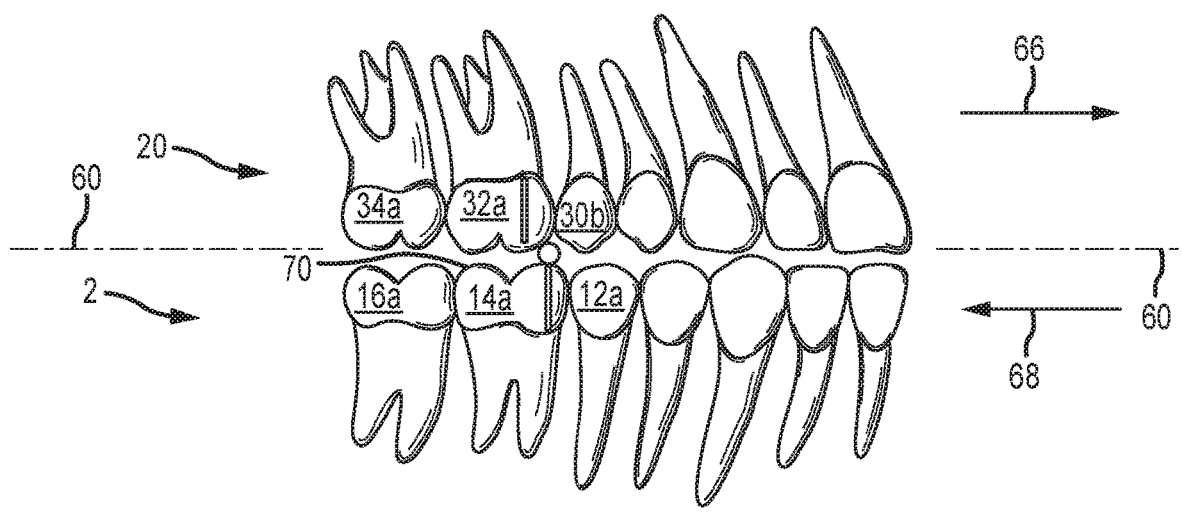
Figure 4C:
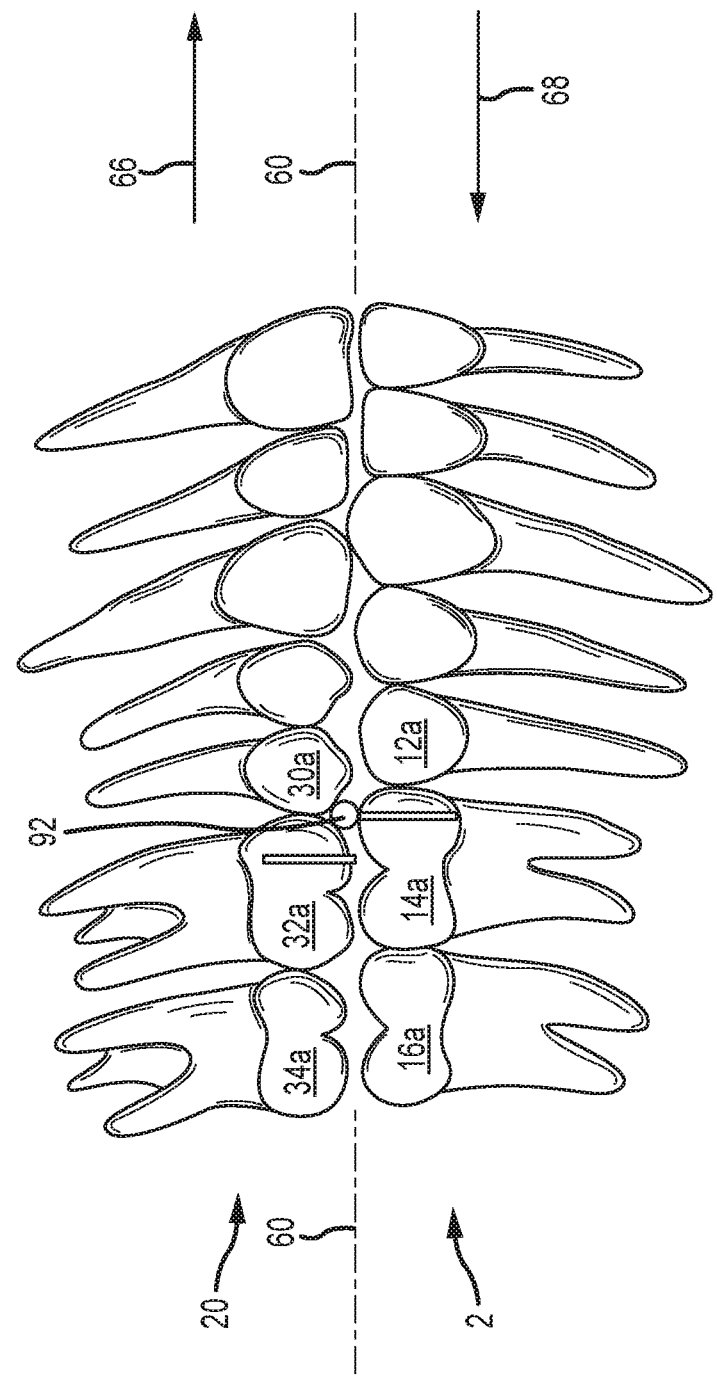

A schematic of another embodiment of an orthodontic appliance in accordance with the foregoing is illustrated in FIGS. 4A-4C. This orthodontic appliance is installed on the lower dentition 2 in FIGS. 4A-4C, and includes an occlusal wire 92 that is disposed on/above the occlusal surface 70 of the lower first molar 14a. This occlusal wire 92 may be anchored to the lower first molar 14a on the lingual 62 of the lower dentition 2 in any appropriate manner. This occlusal wire 92 may extend across a substantial portion of the occlusal surface 70 of the lower first molar 14a (e.g., the occlusal wire 92 may extend from the lingual 62 of the lower dentition 2 and may terminate at or near the buccal 64 of the lower dentition 2).

FIG. 4A illustrates the lower dentition 2 in a retracted position relative to the upper dentition 20 (e.g., a Class II malocclusion). With the dentitions 2, 20 being in this relative position, the occlusal wire 92 prevents closure. That is, the occlusal wire 92 on the lower dentition 2 will engage the upper dentition 20 (e.g., the occlusal surface 70 of the upper first molar 32a). Directing the lower dentition 2 in the mesial direction 66 (or the anterior direction) will align the occlusal wire 92 with the space between the upper first molar 32a and the upper second bicuspid 30a of the upper dentition 20 (FIG. 4B). At this time the dentitions 2, 20 may be moved to the closed position illustrated in FIG. 4C where the occlusal wire 92 (lower dentition 2) will be disposed with the space between the upper first molar 32a and the upper second bicuspid 30a (upper dentition 20) and which should retain the lower dentition 2 in this position relative to the upper dentition 20 (e.g., in Class I occlusion).

When the occlusal wire 92 is installed on a lower first molar (e.g., 14a or 14b) for addressing a Class II malocclusion: 1) the occlusal wire 92 may be disposed over a mesio-lingual cusp and a mesio-buccal cusp of a lower first molar (e.g., 14a or 14b); and 2) the occlusal wire 92 may engage a mesial aspect of the corresponding upper first molar (e.g., 32a or 32b) to encourage or facilitate movement of the mandible in the mesial or anterior direction 66 to dispose the lower dentition 2 and upper dentition 20 in Class I occlusion. When the occlusal wire 92 is installed on a lower first molar (e.g., 14a or 14b) for addressing a Class III malocclusion: 1) the occlusal wire 92 may be disposed over a distal-lingual cusp and a distal-buccal cusp of a lower first molar (e.g., 14a or 14b); and 2) the occlusal wire 92 may engage a distal aspect of the corresponding upper first molar (e.g., 32a or 32b) to encourage or facilitate movement of the maxilla in the mesial or anterior direction 66 to dispose the lower dentition 2 and upper dentition 20 in Class I occlusion.

When the occlusal wire 92 is installed on an upper first molar (e.g., 32a or 32b) for addressing a Class II malocclusion: 1) the occlusal wire 92 may be disposed over a distal-lingual cusp and a distal-buccal cusp of an upper first molar (e.g., 32a or 32b); and 2) the occlusal wire 92 may engage a distal aspect of the corresponding lower first molar (e.g., 14a or 14b) to encourage or facilitate movement of the mandible in the mesial or anterior direction 66 to dispose the lower dentition 2 and upper dentition 20 in Class I occlusion. When the occlusal wire 92 is installed on an upper first molar (e.g., 32a or 32b) for addressing a Class III malocclusion: 1) the occlusal wire 92 may be disposed over a mesio-lingual cusp and a mesio-buccal cusp of an upper first molar (e.g., 32a or 32b); and 2) the occlusal wire 92 may engage a mesial aspect of the corresponding lower first molar (e.g., 14a or 14b) to encourage or facilitate movement of the maxilla in the mesial or anterior direction 66 to dispose the lower dentition 2 and upper dentition 20 in Class I occlusion.

Figure 4D:
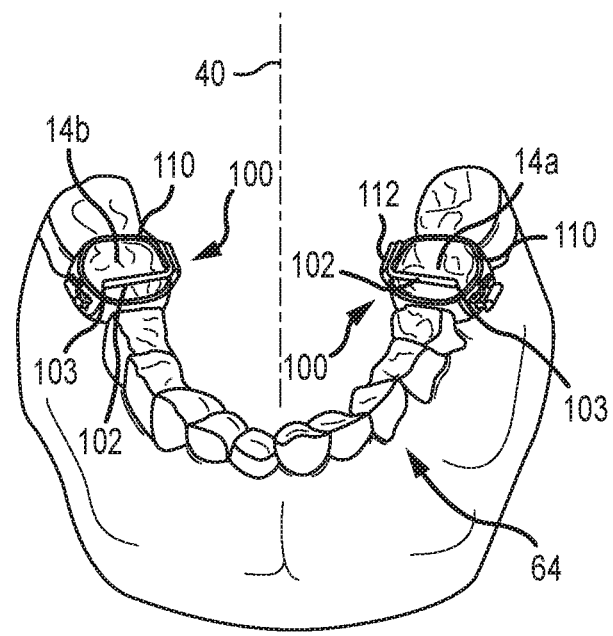
FIG. 4D is a perspective view of the occlusal of the lower arch/dentition, along with a pair of orthodontic appliances that are disposed on opposite sides of the midline of the lower arch/dentition, where each appliance includes an occlusal wire of the type shown in FIGS. 4A-4C.
Figure 4E:
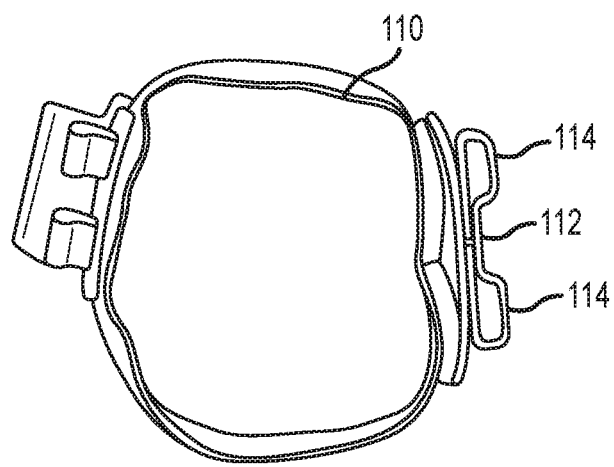
FIG. 4E is an occlusal view of an orthodontic band and a lingual attachment that may be used to install the occlusal wire shown in FIG. 4D.
Figure 4F:
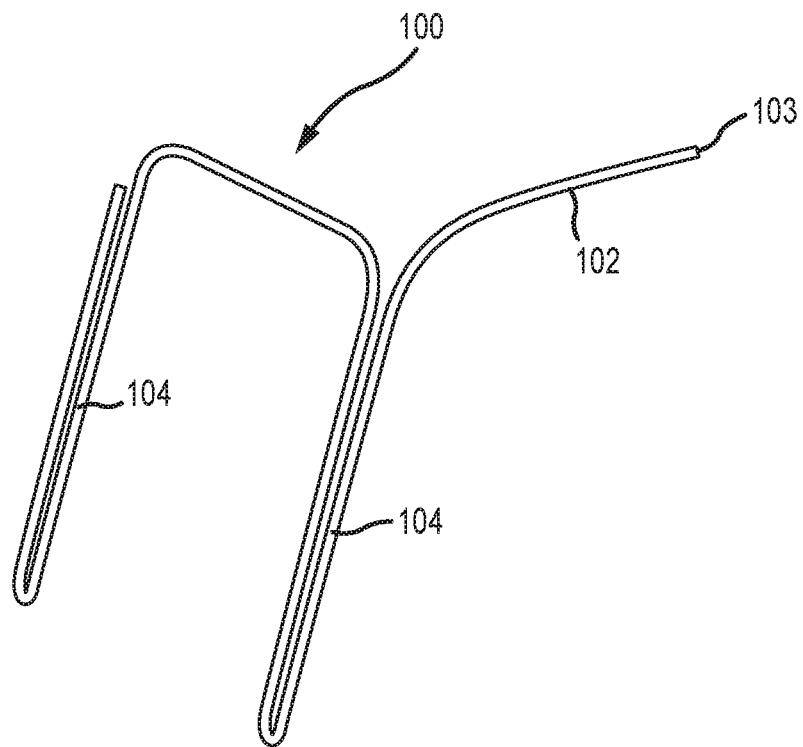
FIG. 4F is a perspective view of one of the orthodontic appliances that is shown in FIG. 4D, where a pair of posts are used to dispose the occlusal wire over the occlusal of the corresponding tooth.

FIGS. 4D-4F show one implementation of the occlusal wire 92 of FIGS. 4A-4C. FIG. 4D shows the lower dentition 2 with an orthodontic appliance 100 being installed on the lower first molar 14a, 14b on each side of the midline 40. A band 110 is installed on the lower first molar 14a, and another band 110 is installed on the lower first molar 14b. A lingual attachment 112 is installed on the lingual of each band 110. Each lingual attachment 112 includes a pair of vertically oriented (extending in an occlusal/gingival dimension) tubes 114. The orthodontic appliance 100 is in the form of (or includes) an attachment having a pair of posts 104 (disposed in the tubes 114 of the lingual attachment 112), and an occlusal wire 102 (corresponding with the above-described occlusal wire 92). The orthodontic appliance 100 could be viewed as what is shown in FIG. 4F, or what is shown in FIG. 4F in combination with the orthodontic band 110 and lingual attachment 112 of FIGS. 4D and 4E. In any case, the occlusal wire 102 is illustrated as having a free end 103, which may be disposed at least generally at the buccal 64 of the lower dentition 2 (e.g., the occlusal wire 102 may extend from the intersection of the occlusal surface 70 with the lingual side 72 of a lower first molar 14a or 14b, to the intersection of the occlusal surface 70 with the buccal side 74 of this same lower first molar 14a or 14b).

Figure 4G:
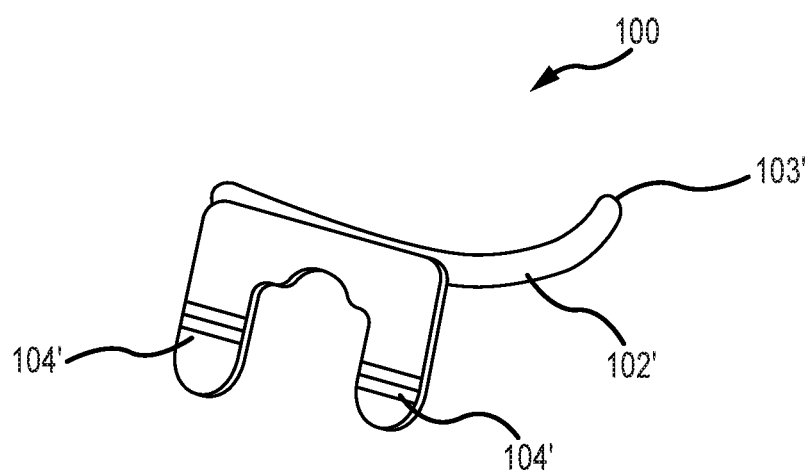
FIG. 4G is a perspective view of a variation of the portion of the orthodontic appliance that is shown in FIG. 4F, where a pair of posts are used to dispose an occlusal bar over the occlusal of the corresponding tooth.

FIG. 4G shows a variation for the orthodontic appliance 100 of FIGS. 4D-4F. The orthodontic appliance 100' presented in FIG. 4G would be installed on the lingual of each band 110 (FIGS. 4D and 4E). The orthodontic appliance 100' is in the form of (or includes) an attachment having a pair of posts 104' (disposed in the tubes 114 of the lingual attachment 112—FIGS. 4D and 4E), and an occlusal bar 102' (corresponding with the above-described occlusal wire 92). The occlusal bar 102' is illustrated as having a free end 103', which may be disposed at least generally at the buccal 64 of the lower dentition 2 (e.g., the occlusal bar 102' may extend from the intersection of the occlusal surface 70 with the lingual side 72 of a lower first molar 14a or 14b, to the intersection of the occlusal surface 70 with the buccal side 74 of this same lower first molar 14a or 14b). The occlusal bar 102' has a slight curvature proceeding from the lingual to the buccal, and with the apex of this curvature being at least generally midway between the lingual and the buccal (e.g., the apex projects in the mesial direction).

Figure 5A:
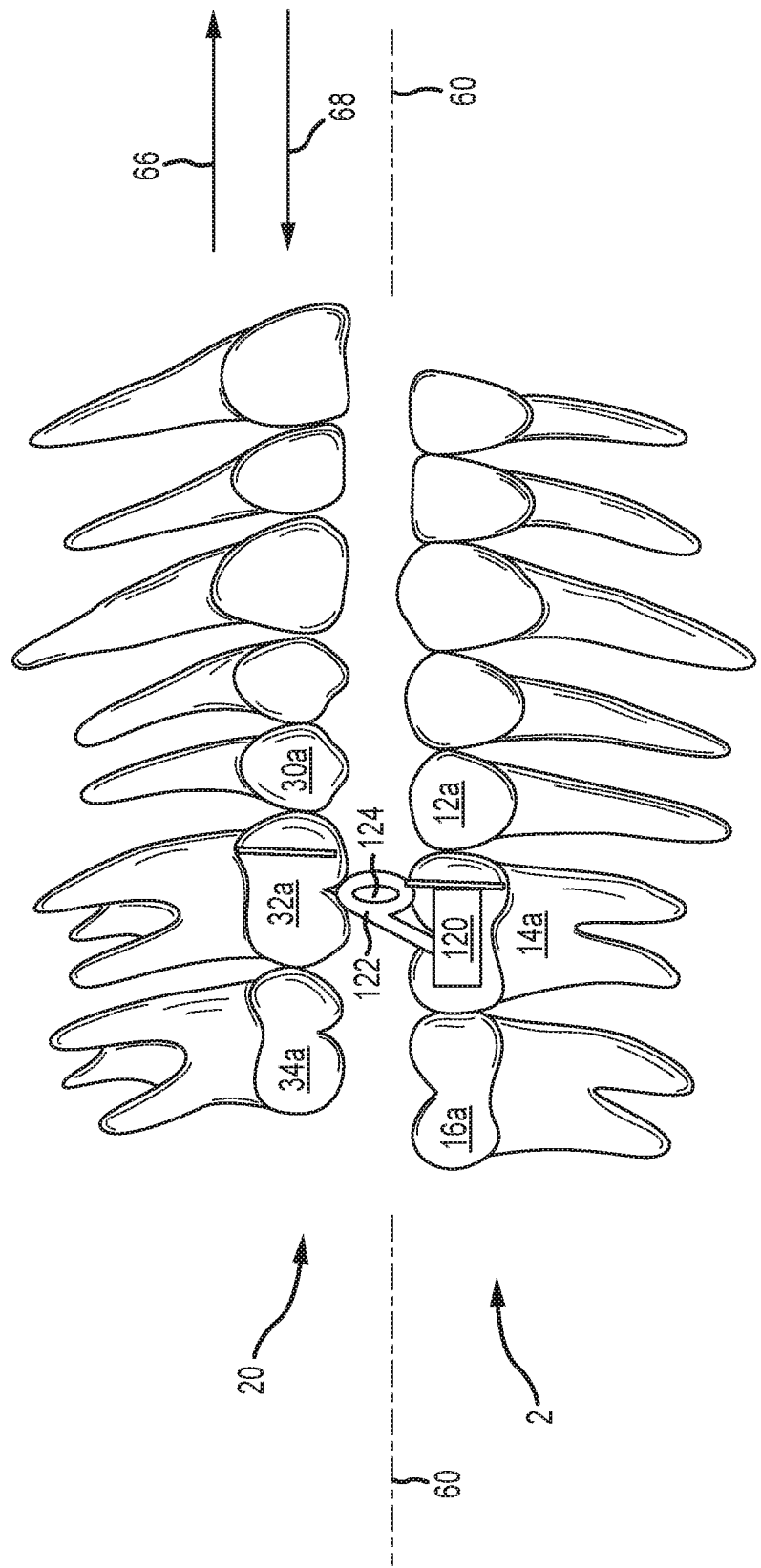
FIGS. 5A-5C are sequential lingual views of one side of the lower arch/dentition and upper arch/dentition, along an occlusal wire loop that facilitates changing from at least one type of malocclusion to a Class I occlusion.
Figure 5B:
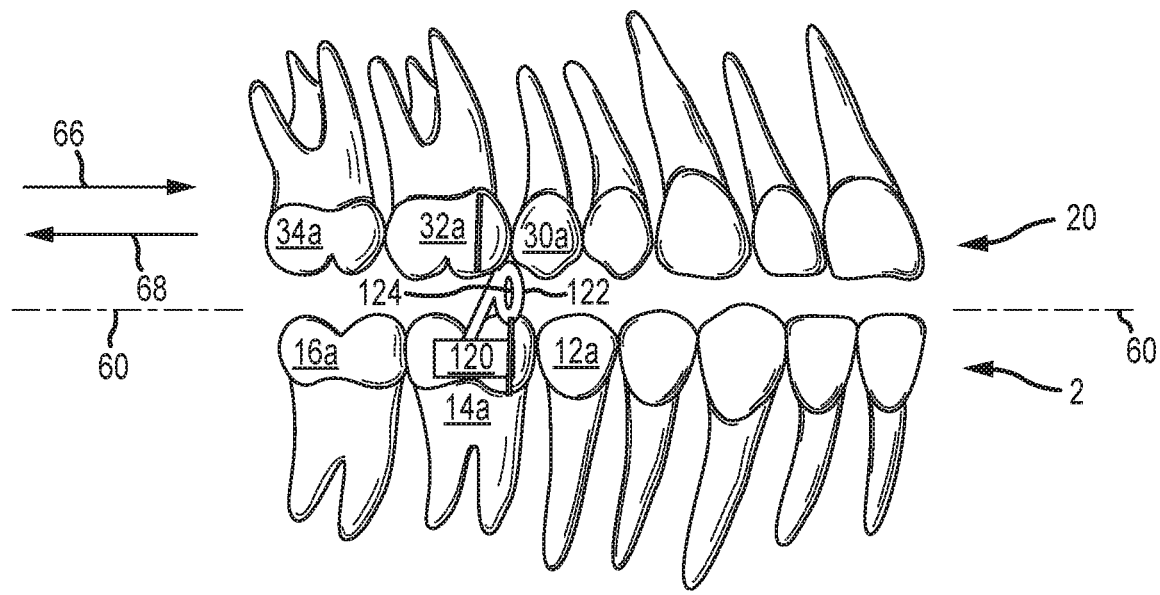
Figure 5C:
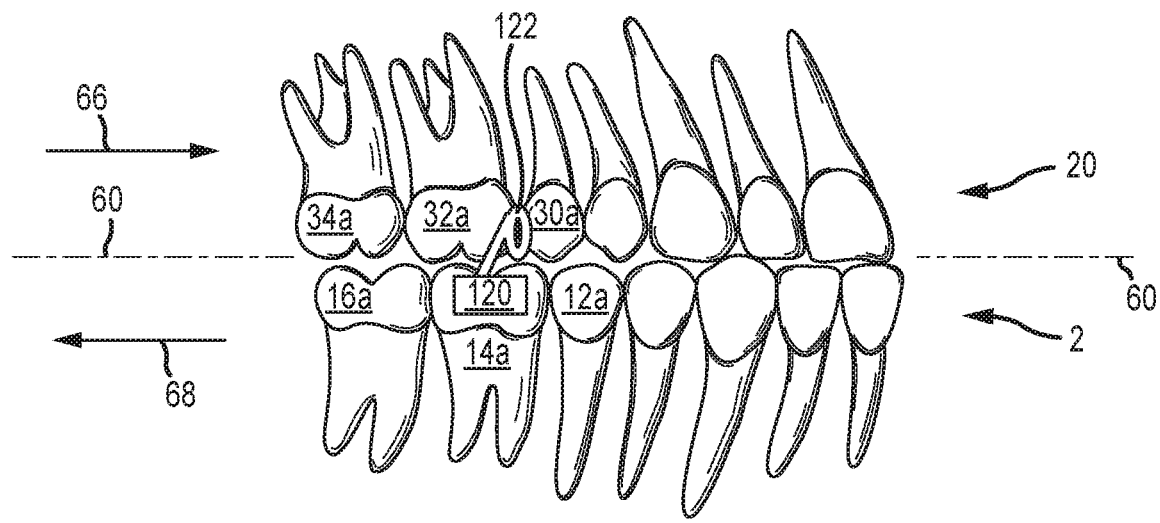

A schematic of another embodiment of an orthodontic appliance in accordance with the foregoing is illustrated in FIGS. 5A-5C and is identified by reference numeral 120. The orthodontic appliance 120 is installed on the lingual 62 of the lower dentition 2 in FIGS. 5A-5C, and includes an occlusal wire loop 122 that protrudes beyond the occlusal plane 60. An aperture 124 of this occlusal wire loop 122 projects or faces in the mesio-distal dimension.

FIG. 5A illustrates the lower dentition 2 in a retracted position relative to the upper dentition 20 (e.g., a Class II malocclusion). With the dentitions 2, 20 being in this relative position, the occlusal wire loop 122 of the orthodontic appliance 120 prevents closure. That is, the occlusal wire loop 122 of the orthodontic appliance 120 on the lower dentition 2 will engage the upper dentition 20 (e.g., the occlusal surface 70 of the upper first molar 32a). Directing the lower dentition 2 in the mesial direction 66 (or the anterior direction) will align the occlusal wire loop 122 of the orthodontic appliance 120 with the space between the upper first molar 32a and the upper second bicuspid 30a of the upper dentition 20 (FIG. 5B). At this time the dentitions 2, 20 may be moved to the closed position illustrated in FIG. 5C where the occlusal wire loop 122 of the orthodontic appliance 120 (lower dentition 2) will be disposed with the space between the upper first molar 32a and the upper second bicuspid 30a (upper dentition 20) and which should retain the lower dentition 2 in this position relative to the upper dentition 20 (e.g., in Class I occlusion).

Figure 5D:
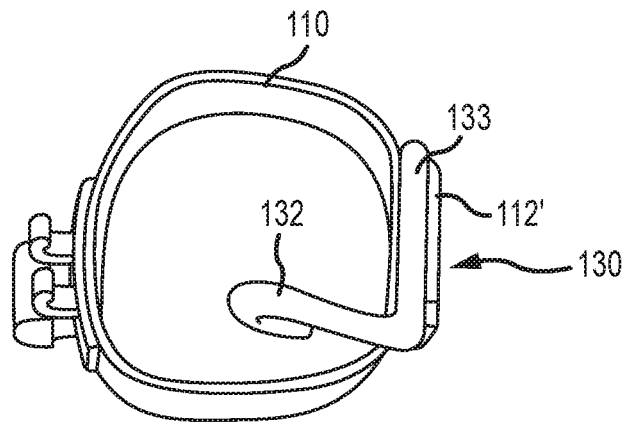
FIG. 5D is an occlusal view of an orthodontic band with a lingual attachment for installing an occlusal wire loop of the type shown in FIGS. 5A-5C.
Figure 5E:
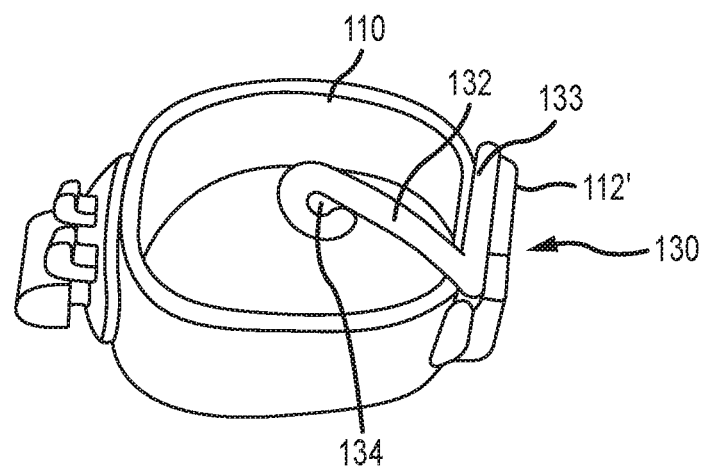
FIG. 5E is a perspective view of an orthodontic band with a lingual attachment for installing an occlusal wire loop of the type shown in FIGS. 5A-5C.

FIGS. 5D and 5E show one implementation of the occlusal wire loop 122 of FIGS. 5A-5C. A band 110 may be installed on the lower first molar on each side of the midline 40 of the lower dentition 2. A lingual attachment 112' is installed on the lingual of each band 110. The orthodontic appliance 130 is in the form of (or includes) an attachment having a first portion 133 (e.g., a mesio-distally extending wire segment) that is appropriately anchored to the lingual attachment 112'), and an occlusal wire loop 132. The occlusal wire loop 132 defines an aperture 134 that projects (or is oriented) in the mesio-distal direction.

When the occlusal wire loop 122 is installed on a lower first molar (e.g., 14a or 14b) for addressing a Class II malocclusion: 1) the occlusal wire loop 122 may be disposed over a mesio-lingual cusp of a lower first molar 14 (e.g., 14a or 14b), and including being disposed over a single cusp of this lower first molar; and 2) the occlusal wire loop 122 may engage a mesial aspect of the corresponding upper first molar (e.g., 32a or 32b) to encourage or facilitate movement of the mandible in the mesial or anterior direction 66 to dispose the lower dentition 2 and upper dentition 20 in Class I occlusion. When the occlusal wire loop 122 is installed on a lower first molar (e.g., 14a or 14b) for addressing a Class III malocclusion: 1) the occlusal wire loop 122 may be disposed over a distal-lingual cusp of a lower first molar (e.g., 14a or 14b), including being disposed over a single cusp of this lower first molar; and 2) the occlusal wire loop 122 may engage a distal aspect of the corresponding upper first molar (e.g., 32a or 32b) to encourage or facilitate movement of the maxilla in the mesial or anterior direction 66 to dispose the lower dentition 2 and upper dentition 20 in Class I occlusion.

When the occlusal wire loop 122 is installed on an upper first molar (e.g., 32a or 32b) for addressing a Class II malocclusion: 1) the occlusal wire loop 122 may be disposed over a distal-lingual cusp of an upper first molar (e.g., 32a or 32b), including being disposed over a single cusp of this upper first molar; and 2) the occlusal wire loop 122 may engage a distal aspect of the corresponding lower first molar (e.g., 14a or 14b) to encourage or facilitate movement of the mandible in the mesial or anterior direction 66 to dispose the lower dentition 2 and upper dentition 20 in Class I occlusion. When the occlusal wire loop 122 is installed on an upper first molar (e.g., 32a or 32b) for addressing a Class III malocclusion: 1) the occlusal wire loop 122 may be disposed over a mesio-lingual cusp of an upper first molar (e.g., 32a or 32b), including being disposed over a single cusp of this upper first molar; and 2) the occlusal wire loop 122 may engage a mesial aspect of the corresponding lower first molar (e.g., 14a or 14b) to encourage or facilitate movement of the maxilla in the mesial or anterior direction 66 to dispose the lower dentition 2 and upper dentition 20 in Class I occlusion.

Figure 6A:
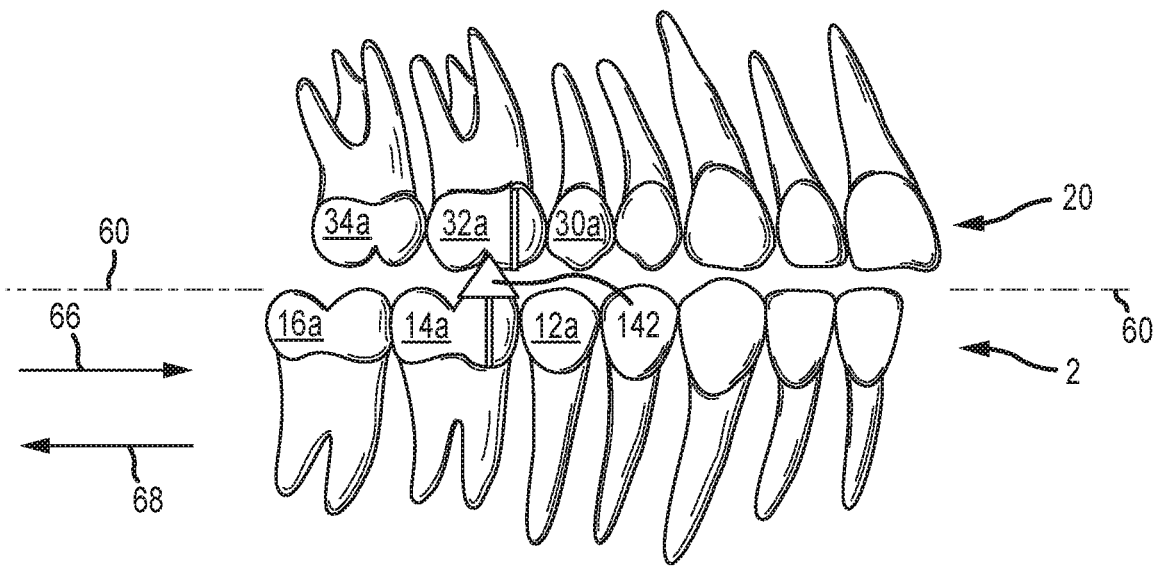
FIGS. 6A-6C are sequential lingual views of one side of the lower arch/dentition and upper arch/dentition, along an occlusal wedge that facilitates changing from at least one type of malocclusion to a Class I occlusion.
Figure 6B:
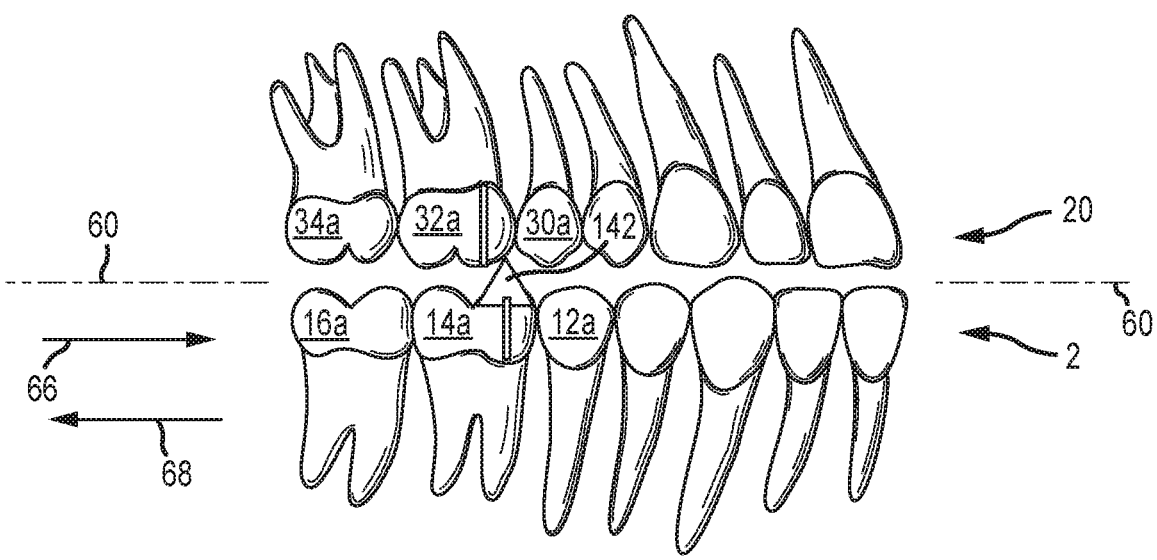
Figure 6C:
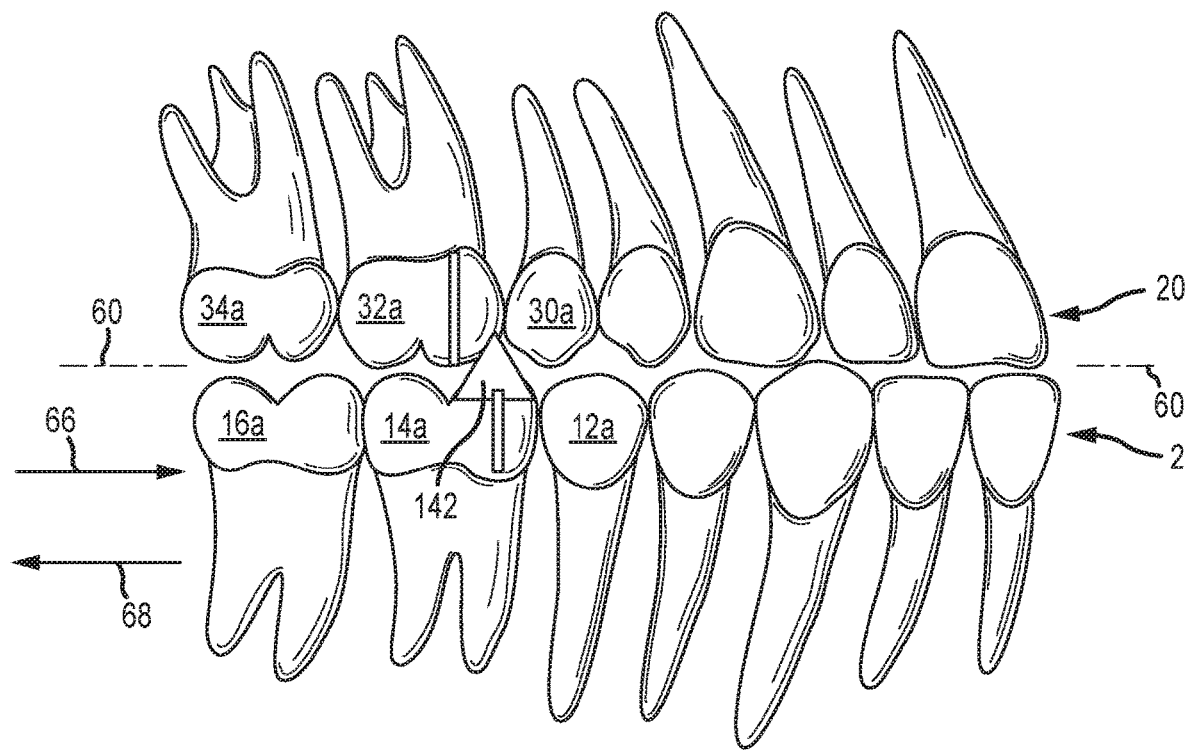

A schematic of another embodiment of an orthodontic appliance in accordance with the foregoing is illustrated in FIGS. 6A-6C. This orthodontic appliance is installed on the lower dentition 2 in FIGS. 6A-6C, and includes an occlusal wedge 142 that is disposed on/above the occlusal surface 70 of the lower first molar 32a. This occlusal wedge 142 may be anchored to the lower first molar 32a on the lingual 62 of the lower dentition 2 (e.g., via an orthodontic band 110 and a corresponding lingual attachment 112) or in any other appropriate manner (e.g., by being incorporated into an overlay, for instance at least generally in accordance with FIGS. 9A-9C that are discussed below). This occlusal wedge 142 may extend across a substantial portion of the occlusal surface 70 of the lower first molar 32a (e.g., the occlusal wedge 142 may extend from the lingual 62 of the lower dentition 2 and may terminate at or near the buccal 64 of the lower dentition 2).

FIG. 6A illustrates the lower dentition 2 in a retracted position relative to the upper dentition 20 (e.g., a Class II malocclusion). With the dentitions 2, 20 being in this relative position, the occlusal wedge 142 prevents closure. That is, the occlusal wedge 142 on the lower dentition 2 will engage the upper dentition 20 (e.g., the occlusal surface 70 of the upper first molar 32a). Directing the lower dentition 2 in the mesial direction 66 (or the anterior direction) will align the occlusal wedge 142 with the space between the upper first molar 32a and the upper second bicuspid 30a of the upper dentition 20 (FIG. 6B). At this time the dentitions 2, 20 may be moved to the closed position illustrated in FIG. 6C where the occlusal wedge 142 (lower dentition 2) will be disposed with the space between the upper first molar 32a and the upper second bicuspid 30a (upper dentition 20) and which should retain the lower dentition 2 in this position relative to the upper dentition 20 (e.g., in Class I occlusion).

Figure 6D:
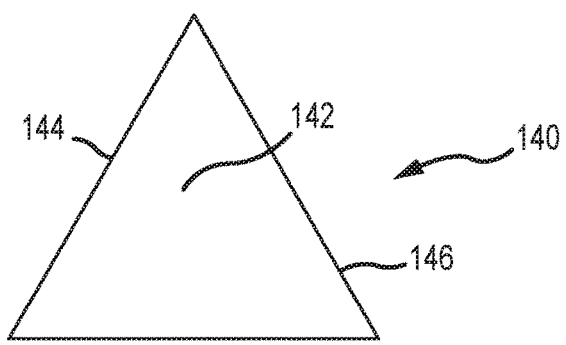
FIG. 6D is an enlarged view of the occlusal wedge shown in FIGS. 6A-6C.

FIG. 6D shows a schematic of an orthodontic appliance 140 that includes the occlusal wedge 142. The occlusal ram 142 may include an inclined surface 144 and an inclined surface 146. One of these inclined surfaces 144, 146 may engage a mesial or a distal aspect of the corresponding first molar in the opposite dentition (depending upon whether the appliance 140 is installed on the lower dentition 2 or the upper dentition 20, and further depending upon whether a Class II or Class III malocclusion is being addressed), and which may be used to advance either the mandible or the maxilla in the mesial or anterior direction (to dispose the lower dentition 2 and upper dentition 20 in Class I occlusion).

Figure 6E:
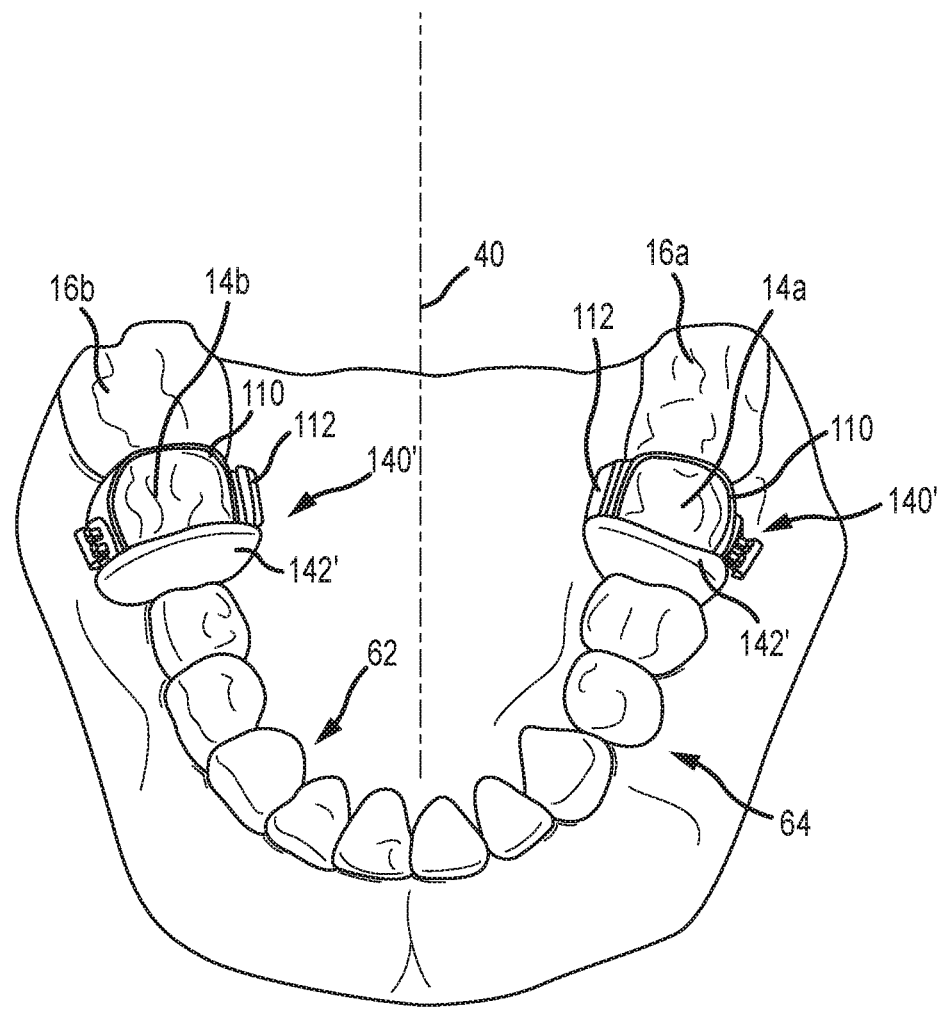
FIG. 6E is a perspective, occlusal view of the lower arch/dentition, along with a pair of orthodontic appliances that are disposed on opposite sides of the midline of the lower arch/dentition, where each appliance includes an occlusal wedge at least generally of the type shown in FIGS. 6A-6C.

FIG. 6E shows one implementation of the occlusal wedge 142 of FIGS. 6A-6C. FIG. 6E shows the lower dentition 2 with an orthodontic appliance 140' being installed on the lower first molar 14a, 14b on each side of the midline 40. A band 110 is installed on the lower first molar 14a, and another band 110 is installed on the lower first molar 14b. A lingual attachment 112 is installed on the lingual of each band 110, and the occlusal wire 102 is interconnected therewith via disposing the posts 104 in the tubes 114 (FIGS. 4D-4F). The occlusal wedge 142' may then be formed over the occlusal wire 102 (e.g., using a light-curable material).

When the occlusal wedge 142 is installed on a lower first molar (e.g., 14a or 14b) for addressing a Class II malocclusion: 1) the occlusal wedge 142 may be disposed over a mesio-lingual cusp and a mesio-buccal cusp of a lower first molar (e.g., 14a or 14b); and 2) the occlusal wedge 142 (inclined surface 144) may engage a mesial aspect of the corresponding upper first molar (e.g., 32a or 32b) to encourage or facilitate movement of the mandible in the mesial or anterior direction 66 to dispose the lower dentition 2 and upper dentition 20 in Class I occlusion. When the occlusal wedge 142 is installed on a lower first molar (e.g., 14a or 14b) for addressing a Class III malocclusion: 1) the occlusal wedge 142 may be disposed over a distal-lingual cusp and a distal-buccal cusp of a lower first molar (e.g., 14a or 14b); and 2) the occlusal wedge 142 (inclined surface 146) may engage a distal aspect of the corresponding upper first molar (e.g., 32a or 32b) to encourage or facilitate movement of the maxilla in the mesial or anterior direction 66 to dispose the lower dentition 2 and upper dentition 20 in Class I occlusion.

When the occlusal wedge 142 is installed on an upper first molar (e.g., 32a or 32b) for addressing a Class II malocclusion: 1) the occlusal wedge 142 may be disposed over a distal-lingual cusp and a distal-buccal cusp of an upper first molar (e.g., 32a or 32b); and 2) the occlusal wedge 142 (inclined surface 146) may engage a distal aspect of the corresponding lower first molar (e.g., 14a or 14b) to encourage or facilitate movement of the mandible in the mesial or anterior direction 66 to dispose the lower dentition 2 and upper dentition 20 in Class I occlusion. When the occlusal wedge 142 is installed on an upper first molar (e.g., 32a or 32b) for addressing a Class III malocclusion: 1) the occlusal wedge 142 may be disposed over a mesio-lingual cusp and a mesio-buccal cusp of an upper first molar (e.g., 32a or 32b); and 2) the occlusal wedge 142 (inclined surface 144) may engage a mesial aspect of the corresponding lower first molar (e.g., 14a or 14b) to encourage or facilitate movement of the maxilla in the mesial or anterior direction 66 to dispose the lower dentition 2 and upper dentition 20 in Class I occlusion.

Figure 7A:
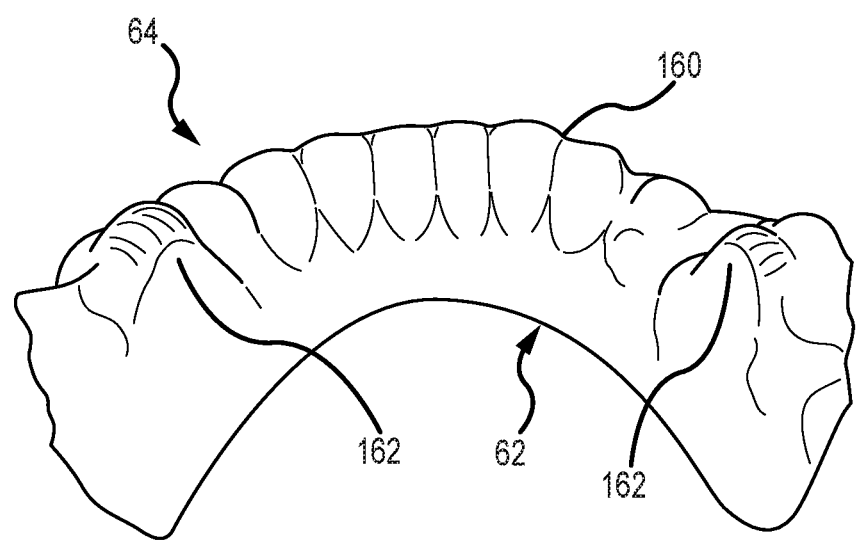
FIG. 7A is a perspective view (looking both occlusally and from a distal or posterior location) of an orthodontic appliance that includes a pair of lingual cuspal extensions that are disposed on opposite sides of the midline of the lower arch/dentition and that facilitate changing from at least one type of malocclusion to a Class I occlusion.
Figure 7B:
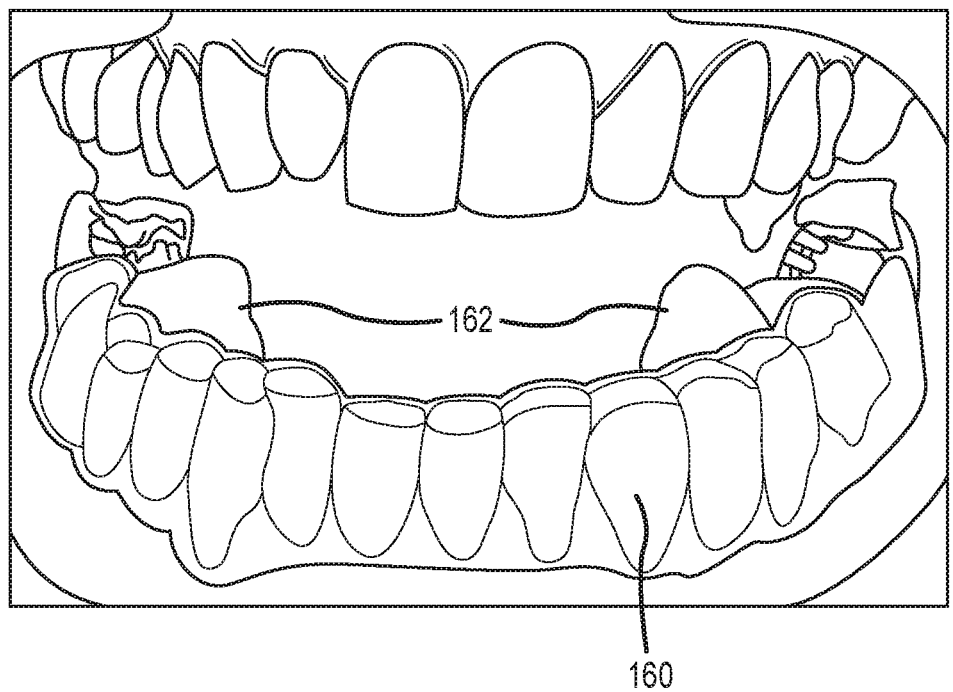
FIG. 7B is a perspective, anterior view of the orthodontic appliance shown in FIG. 7A, and when installed in a patient's mouth.
Figure 7C:
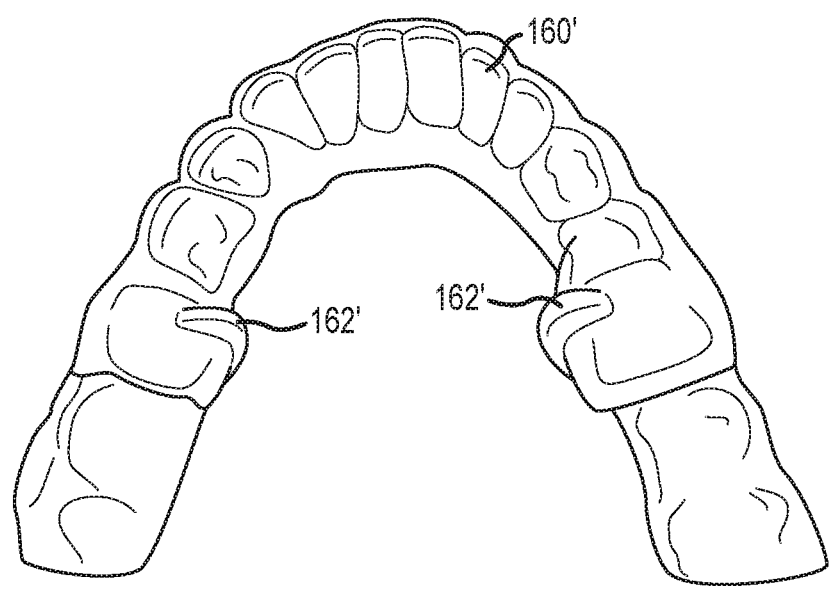
FIG. 7C is a perspective view of the occlusal of the lower arch/dentition, along with a variation of the orthodontic appliance shown in FIGS. 7A and 7B but that still facilitates changing from at least one type of malocclusion to a Class I occlusion.
Figure 7D:
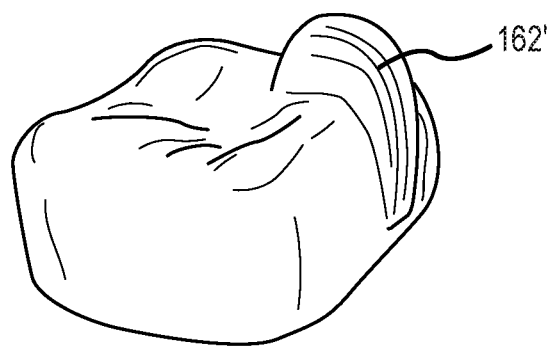
FIG. 7D is a schematic of a portion of the orthodontic appliance of FIG. 7C that includes one of the lingual cuspal extensions.

Another embodiment of an orthodontic appliance in accordance with the foregoing is illustrated in FIGS. 7A and 7B and is identified by reference numeral 160. Here the orthodontic appliance 160 is in the form of an overlay that is disposed over multiple teeth in the lower dentition 2 (including multiple teeth on each side of the midline of the corresponding dentition). This overlay may be an Essix appliance, a retainer, or a positioner. A lingual cuspal extension 162 may be integrally formed with the overlay on each side of the midline. In the embodiment of FIGS. 7A and 7B, each lingual cuspal extension 162 is actually disposed over/extends occlusally from a mesio-lingual cusp of the corresponding lower first molar 14a, 14b. A first molar that has a mesio-lingual cusp, a mesio-buccal mesial cusp, a distal-lingual cusp, and a distal-buccal cusp. FIG. 7C presents a variation of the embodiment of FIGS. 7A and 7B, namely with regard to the shape of the lingual cuspal extension 162'. FIG. 7D is a schematic of a portion of the overlay for the orthodontic appliance 160' that includes a lingual cuspal extension 162'. In the case of the appliances 160 and 160', each lingual cuspal extension 162, 162' is disposed over and extends occlusally from only the mesio-lingual cusp of the corresponding lower first molar 14a, 14b—the appliances 160, 160' do not include any cuspal extension over the mesial-buccal cusp of the corresponding lower first molar 14a, 14b.

When the orthodontic appliance 160 (FIGS. 7A-7B) or the orthodontic appliance 160' (FIG. 7C) is installed on the lower dentition 2 for addressing a Class II malocclusion: 1) each lingual cuspal extension 162, 162' may extend occlusally from a single, mesial cusp of a tooth in the lower dentition 2 (e.g., a mesio-lingual cusp of a lower first molar (e.g., 14a or 14b)); and 2) each lingual cuspal extension 162, 162' may engage a mesial aspect of the corresponding upper first molar (e.g., 32a or 32b) to encourage or facilitate movement of the mandible in the mesial or anterior direction 66 to dispose the lower dentition 2 and upper dentition 20 in Class I occlusion. When the orthodontic appliance 160 (FIGS. 7A-7B) or the orthodontic appliance 160' (FIG. 7C) is installed on the lower dentition 2 for addressing a Class III malocclusion: 1) each lingual cuspal extension 162, 162' may extend occlusally from a single, distal cusp of a tooth in the lower dentition 2 (e.g., a distal-lingual cusp of a lower first molar (e.g., 14a or 14b)); and 2) each lingual cuspal extension 162, 162' may engage a distal aspect of the corresponding upper first molar (e.g., 32a or 32b) to encourage or facilitate movement of the maxilla in the mesial or anterior direction 66 to dispose the lower dentition 2 and upper dentition 20 in Class I occlusion.

When the orthodontic appliance 160 (FIGS. 7a and 7B) or the orthodontic appliance 160' (FIG. 7C) is installed on the upper dentition 20 for addressing a Class II malocclusion: 1) each lingual cuspal extension 162, 162' may extend occlusally from a single, distal cusp of a tooth in the upper dentition 20 (e.g., a distal-lingual cusp of an upper first molar (e.g., 32a or 32b)); and 2) each lingual cuspal extension 162, 162' may engage a distal aspect of the corresponding lower first molar (e.g., 14a or 14b) to encourage or facilitate movement of the mandible in the mesial or anterior direction 66 to dispose the lower dentition 2 and upper dentition 20 in Class I occlusion. When the orthodontic appliance 160 (FIGS. 7a and 7B) or the orthodontic appliance 160' (FIG. 7C) is installed on the upper dentition 20 for addressing a Class III malocclusion: 1) each lingual cuspal extension 162, 162' may extend occlusally from a single, mesial cusp of a tooth in the upper dentition 20 (e.g., a mesio-lingual cusp of an upper first molar (e.g., 32a or 32b)); and 2) each lingual cuspal extension 162, 162' may engage a mesial aspect of the corresponding lower first molar (e.g., 14a or 14b) to encourage or facilitate movement of the maxilla in the mesial or anterior direction to dispose the lower dentition 2 and upper dentition 20 in Class I occlusion.

It should be appreciated that a lingual cuspal extension 162, 162' of the type that is incorporated by the orthodontic appliance 160 (FIGS. 7A-7B) and the orthodontic appliance 160' (FIG. 7C) could be incorporated by an orthodontic appliance that is installed on a single tooth (e.g., a lingual cuspal extension 162 or 162' could be integrated with an orthodontic band via a corresponding lingual attachment). In such a case, an orthodontic appliance that incorporates such a lingual cuspal extension 162, 162' would typically be installed on each side of the corresponding dentition (lower dentition 2 or upper dentition 22). Both Class II and Class III malocclusions could be addressed in the same general manner as described above with regard to the embodiments of FIGS. 7A-7C.

Figure 8A:
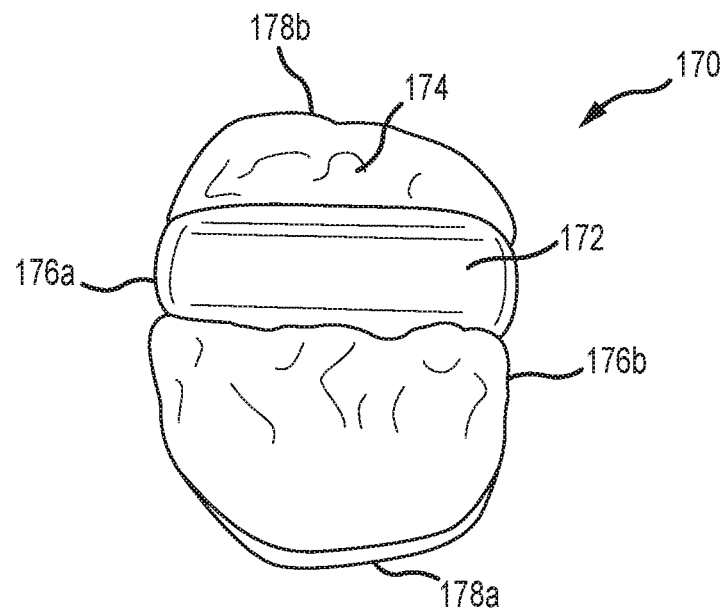
FIG. 8A is an occlusal view of a crown that incorporates an occlusal ridge that facilitates changing from at least one type of malocclusion to a Class I occlusion.
Figure 8B:
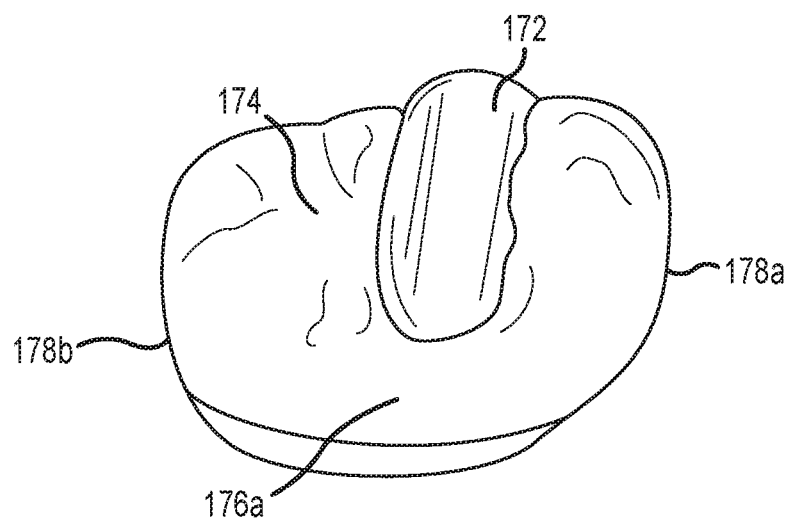
FIG. 8B is a perspective view of the crown shown in FIG. 8A.

FIGS. 8A and 8B present an orthodontic appliance in the form of a crown 170 that is installed on a single tooth in the corresponding dentition. The crown 170 includes an occlusal ridge 172 that extends across an occlusal surface 174 of the crown 170, typically from the intersection between the occlusal surface 174 and a lingual side 176a of the crown 170 to the intersection between the occlusal surface 174 and a buccal side 176a of the crown 170. One portion of the occlusal surface 174 of the crown 170 extends from the occlusal ridge 172 to the intersection between the occlusal surface 174 and a mesial side 178a of the crown 170. Another portion of the occlusal surface 174 of the crown 170 extends from the occlusal ridge 172 to the intersection between the occlusal surface 174 and a distal side 178b of the crown 170. The occlusal surface 174 may be characterized as being defined entirely by the occlusal ridge 172 and a remainder of this occlusal surface, where this remainder is recessed relative to the apex of the occlusal ridge 172.

Figure 8C:
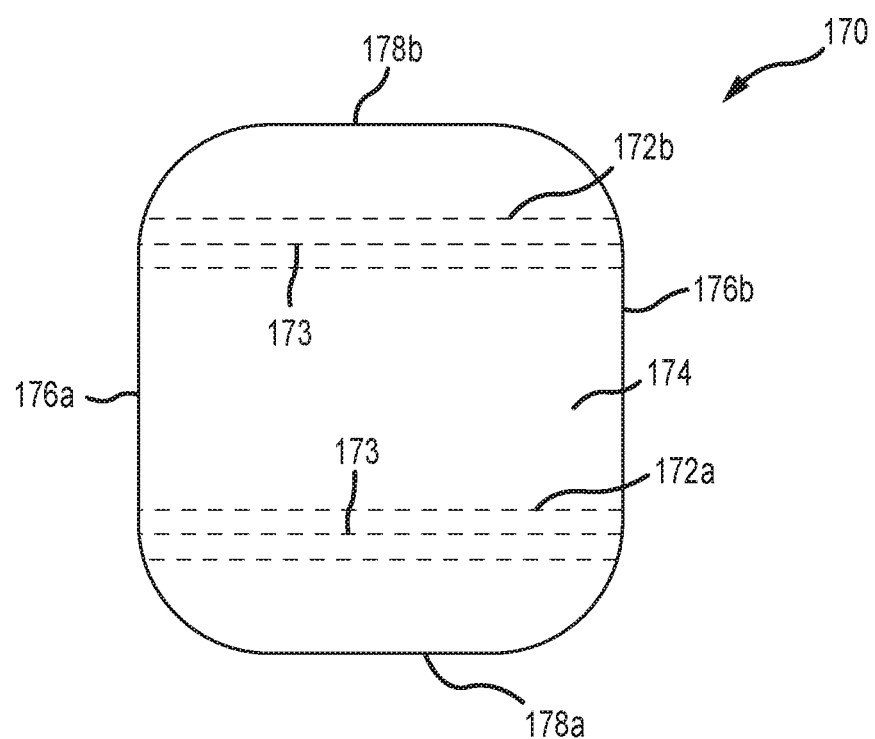
FIG. 8C is an occlusal view of a crown and representative positions for an occlusal ridge that facilitates changing from at least one type of malocclusion to a Class I occlusion.

The occlusal ridge 172 could be of the same configuration as the above-noted occlusal wedge 142 (FIGS. 6A-6C). However, the occlusal ridge 172, particularly when integrally formed with the crown 170, may be configured to include only a single inclined surface (e.g., one of inclined surfaces 144, 146 from FIG. 6D). FIG. 8C is a schematic of the crown 170, and illustrates two representative positions for the occlusal ridge 172a and 172b). FIG. 8C also illustrates the occlusal ridge 172 having a peak 173 that exists between a pair of inclined surfaces (e.g., surfaces 144 and 146 shown in FIG. 6D).

When the crown 170 is installed on a lower first molar (e.g., 14a or 14b) for addressing a Class II malocclusion: 1) the occlusal ridge 172 of the crown 170 may be disposed over a mesio-lingual cusp and a mesio-buccal cusp of a lower first molar (e.g., 14a or 14b); and 2) the occlusal ridge 172 of the crown 170 (corresponding with inclined surface 144 in FIG. 6D) may engage a mesial aspect of the corresponding upper first molar (e.g., 32a or 32b) to encourage or facilitate movement of the mandible in the mesial or anterior direction 66 to dispose the lower dentition 2 and upper dentition 20 in Class I occlusion. When the crown 170 is installed on a lower first molar (e.g., 14a or 14b) for addressing a Class III malocclusion: 1) the occlusal ridge 172 of the crown 170 may be disposed over a distal-lingual cusp and a distal-buccal cusp of a lower first molar (e.g., 14a or 14b); and 2) the occlusal ridge 172 of the crown 170 (corresponding with inclined surface 146 in FIG. 6D) may engage a distal aspect of the corresponding upper first molar (e.g., 32a or 32b) to encourage or facilitate movement of the maxilla in the mesial or anterior direction 66 to dispose the lower dentition 2 and upper dentition 20 in Class I occlusion.

When the crown 170 is installed on an upper first molar (e.g., 32a or 32b) for addressing a Class II malocclusion: 1) the occlusal ridge 172 of the crown 170 may be disposed over a distal-lingual cusp and a distal-buccal cusp of an upper first molar (e.g., 32a or 32b); and 2) the occlusal ridge 172 of the crown 170 (corresponding with inclined surface 146 in FIG. 6D) may engage a distal aspect of the corresponding lower first molar (e.g., 14a or 14b) to encourage or facilitate movement of the mandible in the mesial or anterior direction 66 to dispose the lower dentition 2 and upper dentition 20 in Class I occlusion. When the crown 170 is installed on an upper first molar (e.g., 32a or 32b) for addressing a Class III malocclusion: 1) the occlusal ridge 172 of the crown 170 may be disposed over a mesio-lingual cusp and a mesio-buccal cusp of an upper first molar (e.g., 32a or 32b); and 2) the occlusal ridge 172 of the crown 170 (corresponding with inclined surface 144 in FIG. 6D) may engage a mesial aspect of the corresponding lower first molar (e.g., 14a or 14b) to encourage or facilitate movement of the maxilla in the mesial or anterior direction to dispose the lower dentition 2 and upper dentition 20 in Class I occlusion.

Figure 9A:
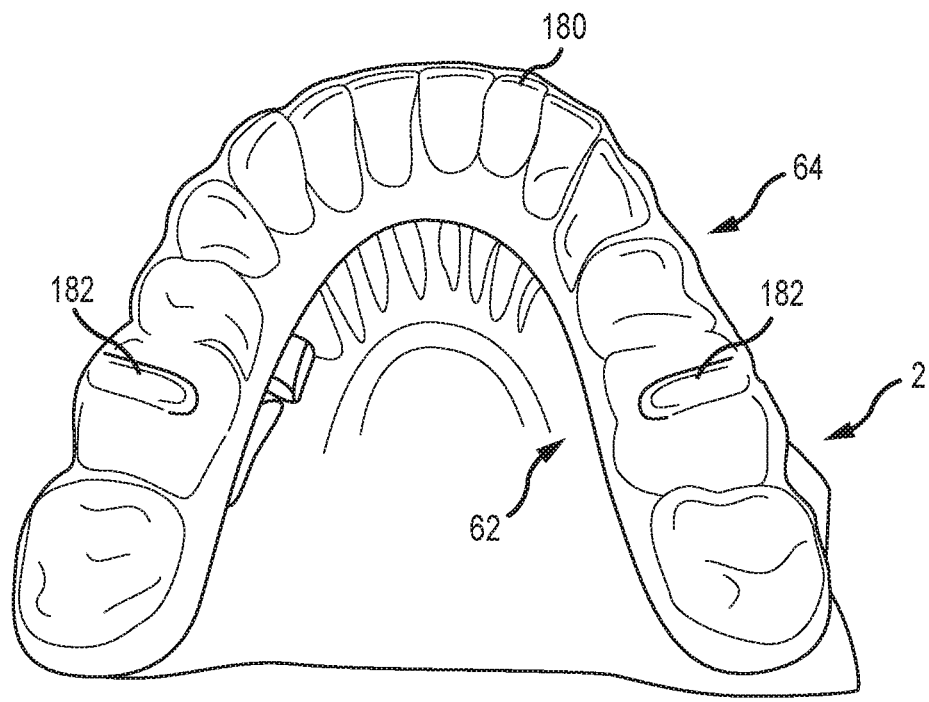
FIG. 9A is an occlusal view of an orthodontic appliance in the form of an overlay that is disposed over multiple teeth of a dentition and that incorporates a pair of occlusal ridges that are disposed on opposite sides of the midline of the corresponding dentition and that facilitate changing from at least one type of malocclusion to a Class I occlusion.
Figure 9B:
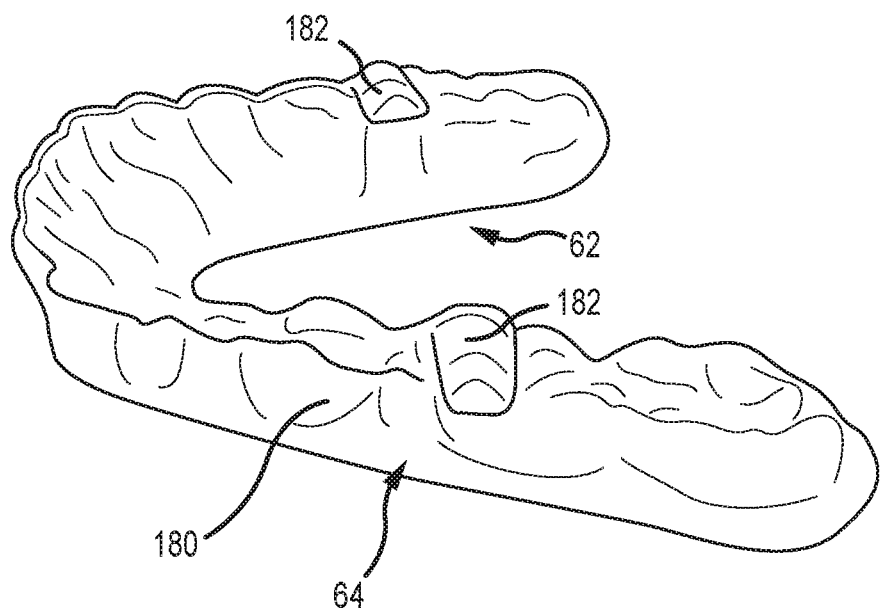
FIG. 9B is a perspective view of the overlay shown in FIG. 9A.
Figure 9C:
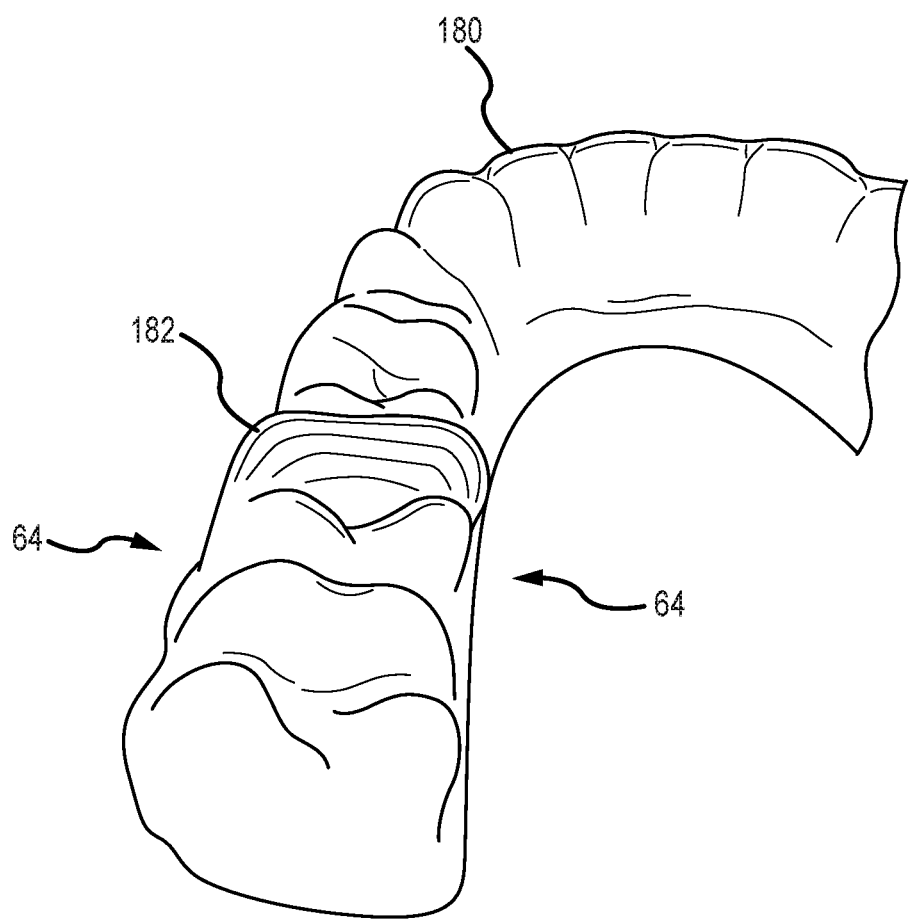
FIG. 9C is an enlarged perspective view of one of the occlusal ridges incorporated by the orthodontic appliance shown in FIGS. 9A and 9B.

The orthodontic appliance 180 shown in FIGS. 9A-9C is in the form of an overlay that is disposed over multiple teeth in the lower dentition 2 (including multiple teeth on each side of the midline of the corresponding dentition, and further including where the overlay is disposed over an entirety of the dentition on which it is to be installed). This overlay may be an Essix appliance, a retainer, or a positioner. The orthodontic appliance 180 includes an occlusal ridge 182 that extends across an occlusal surface 184 of the appliance 180, typically from the lingual 62 to the buccal 64. The discussion of the occlusal ridge 172 for the crown 170 is equally applicable to the occlusal ridge 182 for the appliance 180.

When the appliance 180 is installed on the lower dentition 2 for addressing a Class II malocclusion: 1) each occlusal ridge 182 may be disposed over a mesio-lingual cusp and a mesio-buccal cusp of a corresponding lower first molar (e.g., 14a or 14b); and 2) each occlusal ridge 182 (corresponding with inclined surface 144 in FIG. 6D) may engage a mesial aspect of the corresponding upper first molar (e.g., 32a or 32b) to encourage or facilitate movement of the mandible in the mesial or anterior direction 66 to dispose the lower dentition 2 and upper dentition 20 in Class I occlusion. When the appliance 180 is installed on the lower dentition 2 for addressing a Class III malocclusion: 1) each occlusal ridge 182 of the crown 170 may be disposed over a distal-lingual cusp and a distal-buccal cusp of a corresponding lower first molar (e.g., 14a or 14b); and 2) each occlusal ridge 182 (corresponding with inclined surface 146 in FIG. 6D) may engage a distal aspect of the corresponding upper first molar (e.g., 32a or 32b) to encourage or facilitate movement of the maxilla in the mesial or anterior direction 66 to dispose the lower dentition 2 and upper dentition 20 in Class I occlusion.

When the appliance 180 is installed on the upper dentition 20 for addressing a Class II malocclusion: 1) each occlusal ridge 182 may be disposed over a distal-lingual cusp and a distal-buccal cusp of a corresponding upper first molar (e.g., 32a or 32b); and 2) each occlusal ridge 182 (corresponding with inclined surface 146 in FIG. 6D) may engage a distal aspect of the corresponding lower first molar (e.g., 14a or 14b) to encourage or facilitate movement of the mandible in the mesial or anterior direction 66 to dispose the lower dentition 2 and upper dentition 20 in Class I occlusion. When the appliance 180 is installed on the upper dentition 20 for addressing a Class III malocclusion: 1) each occlusal ridge 182 may be disposed over a mesio-lingual cusp and a mesio-buccal cusp of a corresponding upper first molar (e.g., 32a or 32b); and 2) the occlusal ridge 182 (corresponding with inclined surface 144 in FIG. 6D) may engage a mesial aspect of the corresponding lower first molar (e.g., 14a or 14b) to encourage or facilitate movement of the maxilla in the mesial or anterior direction 66 to dispose the lower dentition 2 and upper dentition 20 in Class I occlusion.

The foregoing description of the present invention has been presented for purposes of illustration and description. Furthermore, the description is not intended to limit the invention to the form disclosed herein. Consequently, variations and modifications commensurate with the above teachings, and skill and knowledge of the relevant art, are within the scope of the present invention. The embodiments described hereinabove are further intended to explain best modes known of practicing the invention and to enable others skilled in the art to utilize the invention in such, or other embodiments and with various modifications required by the particular application(s) or use(s) of the present invention. It is intended that the appended claims be construed to include alternative embodiments to the extent permitted by the prior art.

The following claims encompass the present invention. The orthodontic appliances that are addressed in the following method claims are themselves also within the scope of the present invention. The present invention is also encompassed by an orthodontic model (e.g., a stone model or digital model of both an upper dentition and a lower dentition for a patient), where a pair of occlusal protrusions (incorporated by a single orthodontic appliance, or where each occlusal protrusion is associated with a separate orthodontic appliance) are disposed on opposite sides of the midline of a common dentition.

What is claimed:

1. A method of using an orthodontic appliance, comprising:
    obstructing closure of a patient's jaw when a first dentition and a second dentition of the patient are in a first relative position in a mesio-distal dimension, wherein the obstructing step comprises engaging a first appliance directly against the second dentition, wherein the first appliance is installed on the first dentition and comprises an overlay that is disposed over multiple teeth on each side of a first midline of the first dentition, wherein the first appliance comprises a first occlusal ridge and a second occlusal ridge that each protrude beyond an occlusal plane between the first dentition and the second dentition, wherein the first occlusal ridge is disposed over the occlusal of a first tooth on a first side of the first midline of the first dentition, wherein the second occlusal ridge is disposed over the occlusal of a second tooth on a second side of the first midline of the first dentition, wherein the obstructing closure step comprises engaging each of the first occlusal ridge and the second occlusal ridge of the first appliance directly against the second dentition, wherein the overlay comprises an occlusal surface, a buccal surface, and a lingual surface that each extend from the first occlusal ridge to the second occlusal ridge, as well as distally of each of the first occlusal ridge and the second occlusal ridge, and wherein the first occlusal ridge and the second occlusal ridge are each disposed on the occlusal surface of the overlay and protrude in the direction of the second dentition relative to adjacent portions of the occlusal surface of the overlay on both a mesial and a distal of the corresponding first and second occlusal ridge;
    moving a lower jaw of the patient relative to an upper jaw of the patient, and to dispose the first dentition and the second dentition in a second relative position in the mesio-distal dimension, wherein the moving a lower law step further comprises:
        the first occlusal ridge of the first appliance on the first dentition contacting and camming off of a first tooth in the second dentition that is on a first side of a second midline of the second dentition; and
        the second occlusal ridge of the first appliance on the first dentition contacting and camming off of a second tooth in the second dentition that is on a second side of the second midline of the second dentition; and
    closing the patient's jaw after the moving step and with the first dentition and the second dentition being in the second relative position, wherein the closing the patient's jaw step comprises directing the first occlusal ridge of the first appliance into a space between an adjacent pair of teeth on the first side of the second midline of the second dentition and directing the second occlusal ridge of the first appliance into a space between an adjacent pair of teeth on the second side of the second midline of the second dentition, wherein a spacing between the first and second dentitions is smaller in the second relative position compared to the first relative position.

2. The method of claim 1, wherein the first relative position is when molars of the first dentition and the second dentition are in a Class II relationship, and wherein the second relative position is when the molars of the first dentition and the second dentition are in a Class I relationship.

3. The method of claim 1, wherein the first relative position is when molars of the first dentition and the second dentition are in a Class III relationship, and wherein the second relative position is when the molars of the first dentition and the second dentition are in a Class I relationship.

4. The method of claim 1, wherein the overlay is disposed over the entirety of the first dentition.

5. The method of claim 1, wherein both the first occlusal ridge and the second occlusal ridge each extend from a lingual to a buccal of the first dentition.

6. The method of claim 1, wherein the first tooth in the first dentition is a lower first molar on the first side of the first midline of the first dentition, and wherein the second tooth in the first dentition is a lower first molar on the second side of the first midline of the first dentition.

7. The method of claim 6, wherein the moving step further comprises addressing a Class II malocclusion by:
the first occlusal ridge engaging a mesial aspect of an upper first molar on the first side of the second midline of the second dentition and with the first occlusal ridge being disposed over both a mesio-lingual cusp and a mesio-buccal cusp of the lower first molar on the first side of the first midline of the first dentition; and
the second occlusal ridge engaging a mesial aspect of an upper first molar on the second side of the second midline of the second dentition and with the second occlusal ridge being disposed over both a mesio-lingual cusp and a mesio-buccal cusp of the lower first molar on the second side of the first midline of the first dentition,
wherein the upper first molar on the first side of the second midline of the second dentition is the first tooth in the second dentition on the first side of the second midline of the second dentition and the upper first molar on the second side of the second midline of the second dentition is the second tooth in the second dentition of the second side of the second midline on the second dentition.

8. The method of claim 6, wherein the moving step further comprises addressing a Class III malocclusion by:
the first occlusal ridge engaging a distal aspect of an upper first molar on the first side of the second midline of the second dentition and with the first occlusal ridge being disposed over both a distal-lingual cusp and a distal-buccal cusp of the lower first molar on the first side of the first midline of the first dentition;
and the second occlusal ridge engaging a distal aspect of an upper first molar on the second side of the second midline of the second dentition and with the second occlusal ridge being disposed over both a distal-lingual cusp and a distal-buccal cusp of the lower first molar on the second side of the first midline of the first dentition,
wherein the upper first molar on the first side of the second midline of the second dentition is the first tooth in the second dentition on the first side of the second midline of the second dentition and the upper first molar on the second side of the second midline of the second dentition is the second tooth in the second dentition of the second side of the second midline on the second dentition.

9. The method of claim 1, wherein the first tooth in the first dentition is an upper first molar on the first side of the first midline of the first dentition, and wherein the second tooth in the first dentition is an upper first molar on the second side of the first midline of the first dentition.

10. The method of claim 9, wherein the moving step further comprises addressing a Class II malocclusion by:
the first occlusal ridge engaging a distal aspect of a lower first molar on the first side of the second midline of the second dentition and with the first occlusal ridge being disposed over both a distal-lingual cusp and a distal-buccal cusp of the upper first molar on the first side of the first midline of the first dentition; and
the second occlusal ridge engaging a distal aspect of a lower first molar on the second side of the second midline of the second dentition and with the second occlusal ridge being disposed over both a distal-lingual cusp and a distal-buccal cusp of the upper first molar on the second side of the first midline of the first dentition,
wherein the lower first molar on the first side of the second midline of the second dentition is the first tooth in the second dentition on the first side of the second midline of the second dentition and the lower first molar on the second side of the second midline of the second dentition is the second tooth in the second dentition of the second side of the second midline on the second dentition.

11. The method of claim 9, wherein the moving step further comprises addressing a Class III malocclusion by:
the first occlusal ridge engaging a mesial aspect of a lower first molar on the first side of the second midline of the second dentition and with the first occlusal ridge being disposed over both a mesio-lingual cusp and a mesio-buccal cusp of the upper first molar on the first side of the first midline of the first dentition; and
the second occlusal ridge engaging a mesial aspect of a lower first molar on the second side of the second midline of the second dentition and with the second occlusal ridge being disposed over both a mesio-lingual cusp and a mesio-buccal cusp of the upper first molar on the second side of the first midline of the first dentition,
wherein the lower first molar on the first side of the second midline of the second dentition is the first tooth in the second dentition on the first side of the second midline of the second dentition and the lower first molar on the second side of the second midline of the second dentition is the second tooth in the second dentition of the second side of the second midline on the second dentition.

12. The method of claim 1, wherein the first tooth in the first dentition is a lower second molar on the first side of the first midline of the first dentition, and wherein the second tooth in the first dentition is a lower second molar on the second side of the first midline of the first dentition.

13. The method of claim 1, wherein the first tooth in the first dentition is an upper second molar on the first side of the first midline of the first dentition, and wherein the second tooth in the first dentition is an upper second molar on the second side of the first midline of the first dentition.

14. The method of claim 1, wherein the first occlusal ridge is disposed over a mesio-lingual cusp and a mesio-buccal cusp of the first tooth in the first dentition, wherein the second occlusal ridge is disposed over a mesio-lingual cusp and a mesio-buccal cusp of the second tooth in the first dentition, and wherein the first dentition is a lower dentition of the patient.

15. The method of claim 1, wherein the first occlusal ridge is disposed over a distal-lingual cusp and a distal-buccal cusp of the first tooth in the first dentition, and wherein the second occlusal ridge is disposed over a distal-lingual cusp and a distal-buccal cusp of the second tooth in the first dentition, and wherein the first dentition is a lower dentition of the patient.

16. The method of claim 1, wherein the first occlusal ridge is disposed over a distal-lingual cusp and a distal-buccal cusp of the first tooth in the first dentition, wherein the second occlusal ridge is disposed over a distal-lingual cusp and a distal-buccal cusp of the second tooth in the first dentition, and wherein the first dentition is an upper dentition of the patient.

17. The method of claim 1, wherein the first occlusal ridge is disposed over a mesio-lingual cusp and a mesio-buccal cusp of the first tooth in the first dentition, and wherein the second occlusal ridge is disposed over a mesio-lingual cusp and a mesio-buccal cusp of the second tooth in the first dentition, wherein the first dentition is an upper dentition of the patient.

18. The method of claim 1, wherein the overlay is selected from the group consisting of an Essix appliance, a retainer, and a positioner.

* * * * *